United States Patent [19]

Olson et al.

[11] Patent Number: 4,484,263
[45] Date of Patent: Nov. 20, 1984

[54] COMMUNICATIONS CONTROLLER

[75] Inventors: David E. Olson, Norfolk; Peter E. Simpson, Natick; Kurt A. Melden, West Newton; Terence Dowling, Westboro, all of Mass.

[73] Assignee: Data General Corporation, Westboro, Mass.

[21] Appl. No.: 305,897

[22] Filed: Sep. 25, 1981

[51] Int. Cl.³ .................... G06F 3/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,075,691 | 2/1978 | Davis et al. | 364/200 |
| 4,079,452 | 3/1978 | Larson et al. | 364/200 |
| 4,110,830 | 8/1978 | Krygowski | 364/200 |
| 4,124,891 | 11/1978 | Weller et al. | 364/200 |
| 4,177,515 | 12/1979 | Jenkins et al. | 364/200 |
| 4,328,543 | 5/1982 | Brickman et al. | 364/200 |
| 4,410,961 | 10/1983 | Dlugos et al. | 364/900 |

Primary Examiner—Jerry Smith
Assistant Examiner—William G. Niessen
Attorney, Agent, or Firm—Jacob Frank; Joel Wall; Irving M. Kriegsman

[57] ABSTRACT

An intelligent asynchronous controller (IAC) for use in operably coupling a plurality of asynchronous input/output (I/O) devices to a host central processing unit (CPU) is disclosed. The IAC is designed and programmed to control the transfer of data between the plurality of I/O devices and the CPU, to perform character processing on the data received from the I/O devices before transmission to the host CPU and to perform other types of data processing. The IAC is organized around a central processor bus and includes a host interface section which serves as a communication link between the host CPU and the central processor bus, a processor unit which controls the overall operations of the IAC and which contains a date manipulation section and a control processor section, a memory section for providing local read/write storage for the processor along with read only storage for use on power up and certain other instances, a communications interface section for interfacing the IAC with the plurality of I/O devices, a status section for providing certain status indications for the IAC and a power supply section. The host interface section features an internal mapping unit (IMU) which expands the fifteen bit address provided by the processor section to the nineteen bit address of the CPU bus. The processor section features a processor which is capable of processing upwards of 5000 characters a second. The memory section features a read/write memory unit which is used to store the program and data and a "power up" ROM which enables the IAC to run internal diagnostic tests. The communications interface section features a split BAUD clock selection unit which enables split BAUD rate transmissions when the IAC is connected to modems rather than directly to I/O devices.

20 Claims, 30 Drawing Figures

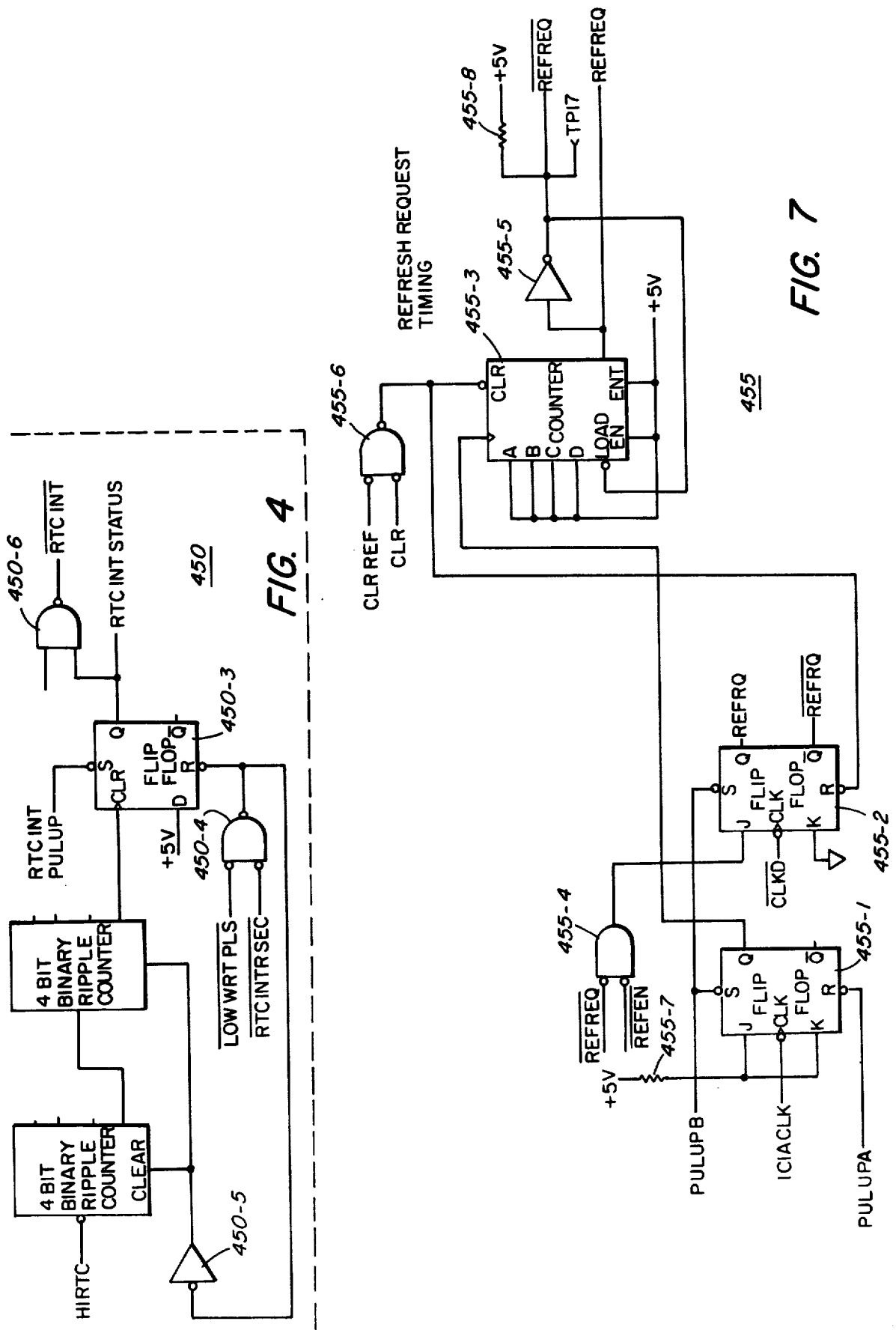

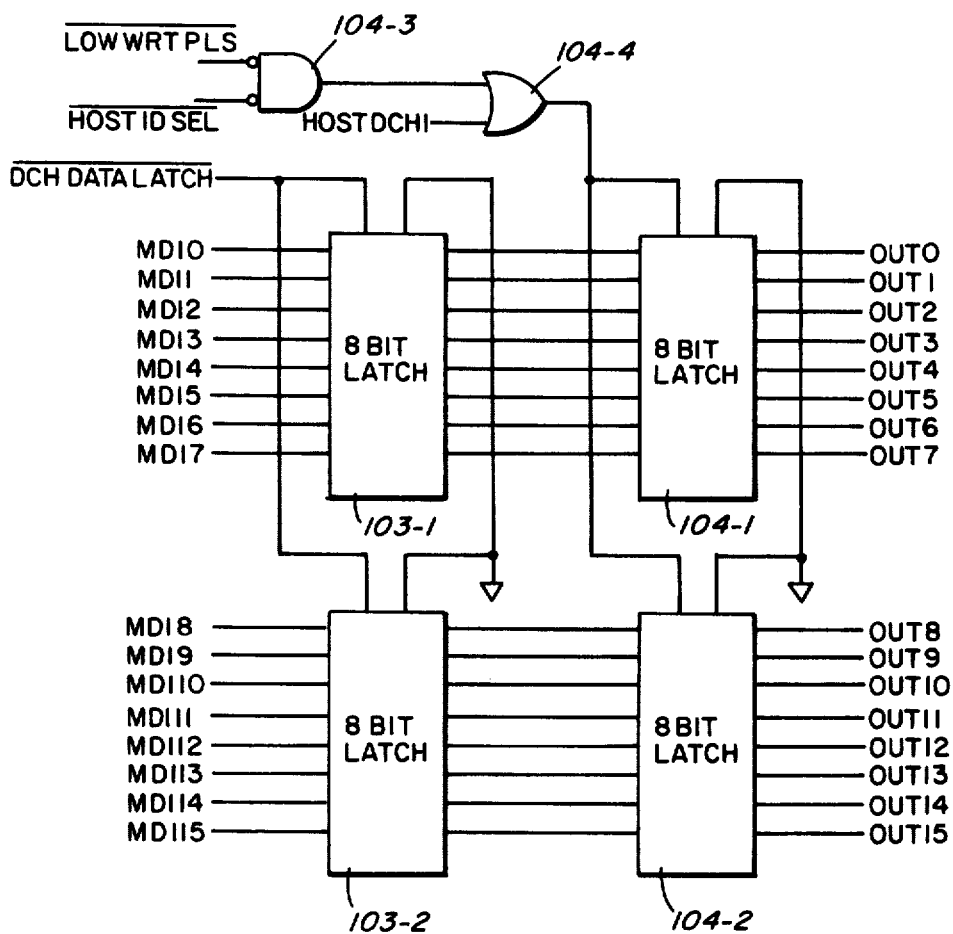
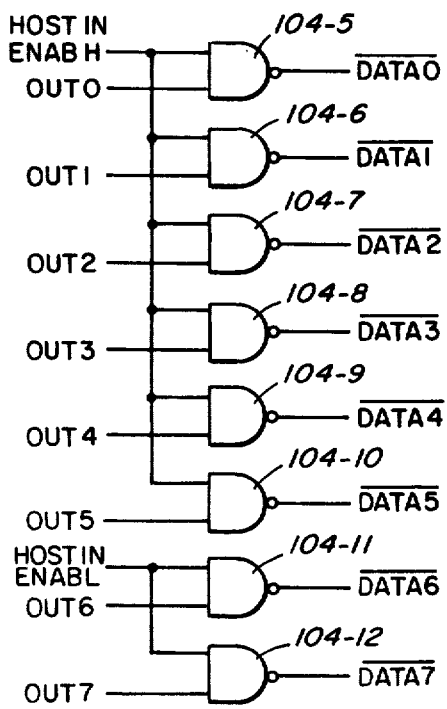
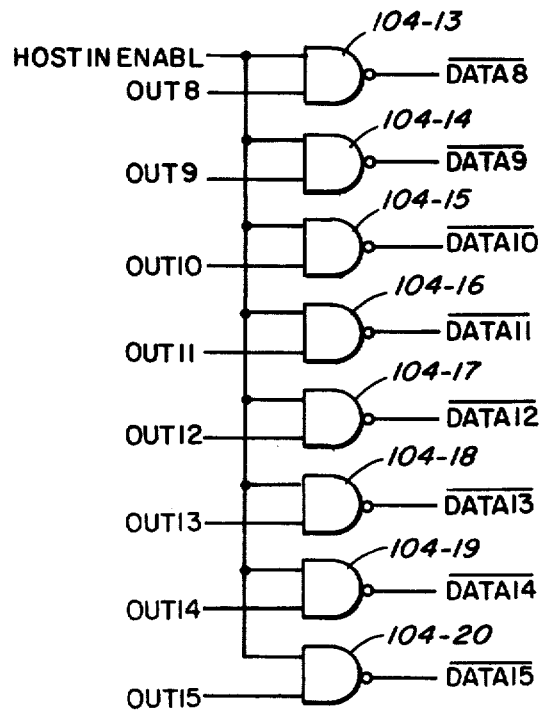
FIG. 8

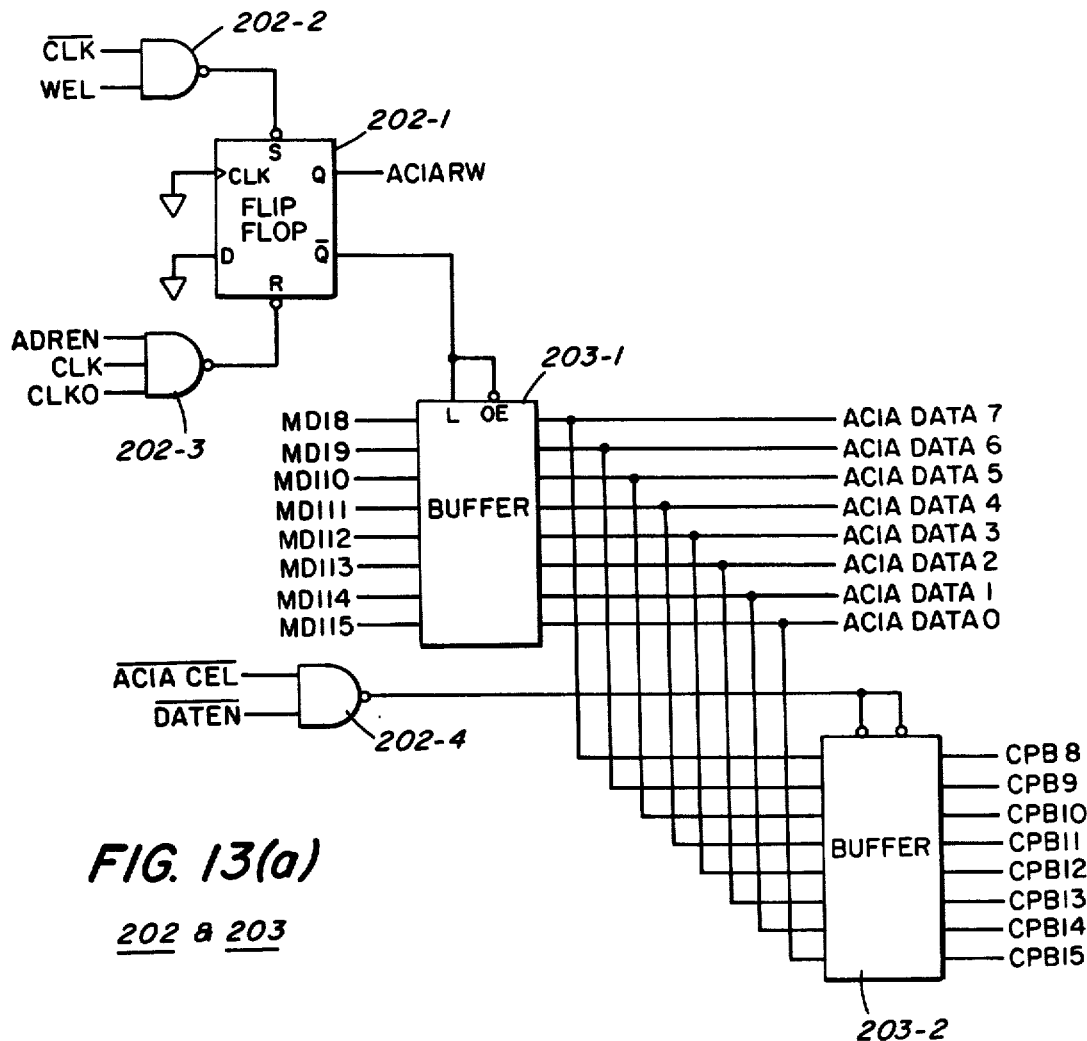
FIG. 13(a)
202 & 203
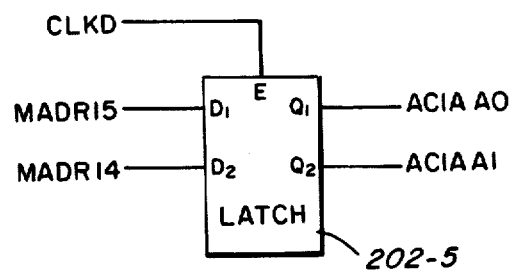

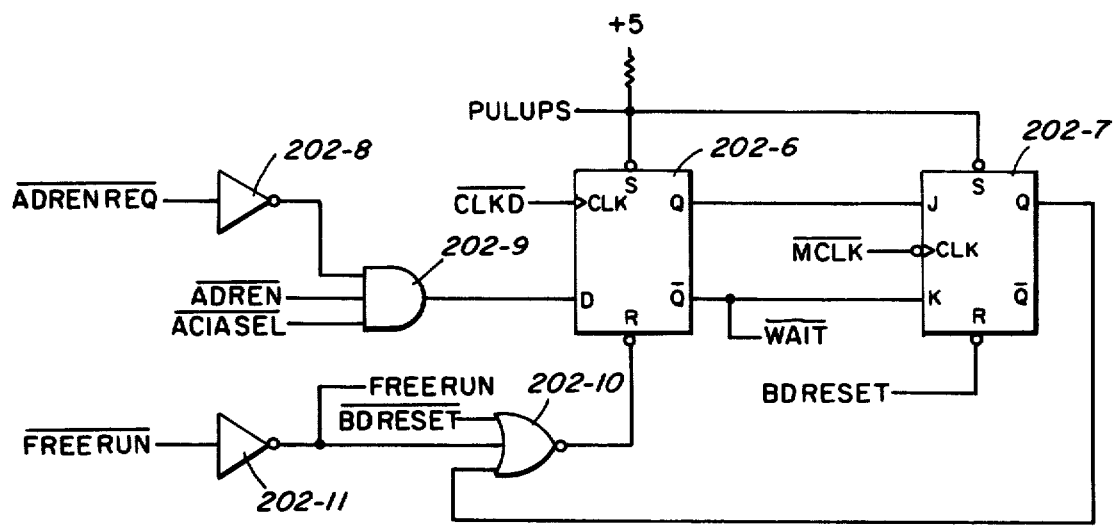
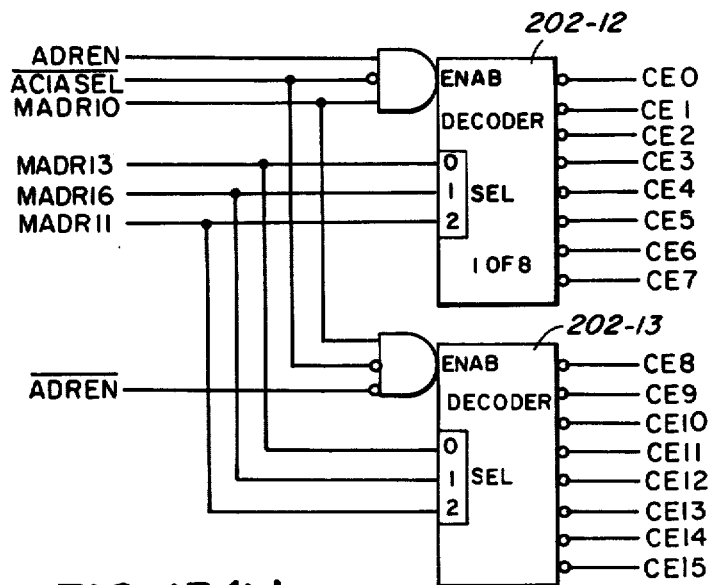
FIG. 13(b)
202 & 203

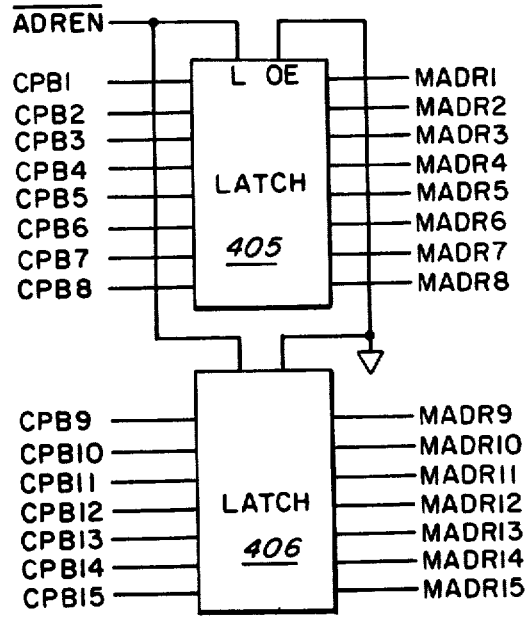
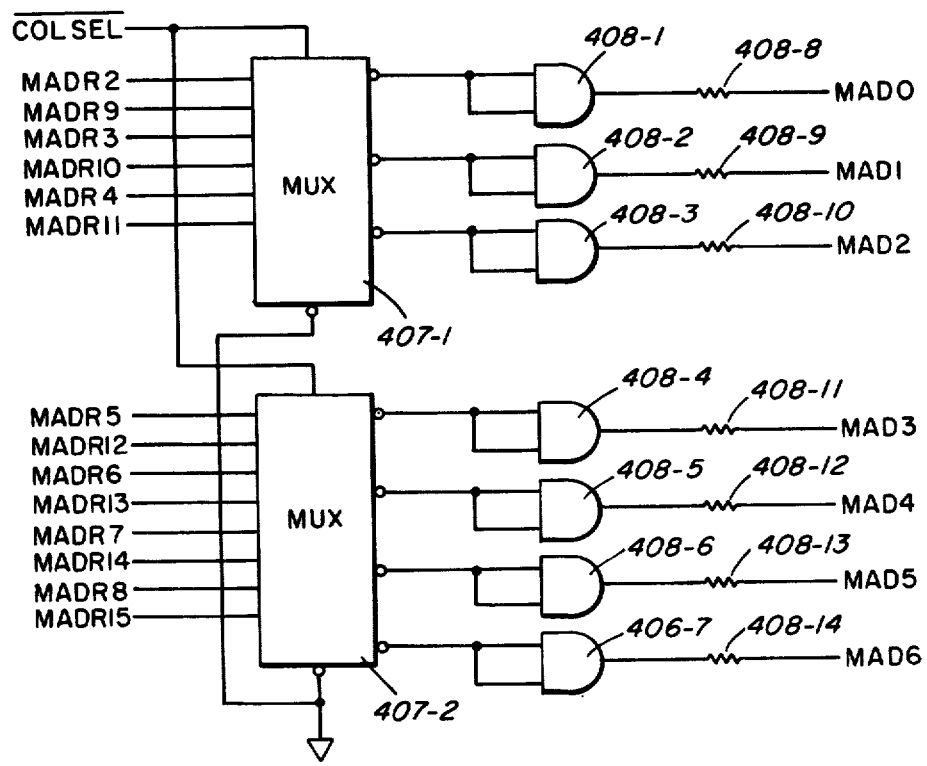
FIG. 20
405 & 406 & 407 & 408

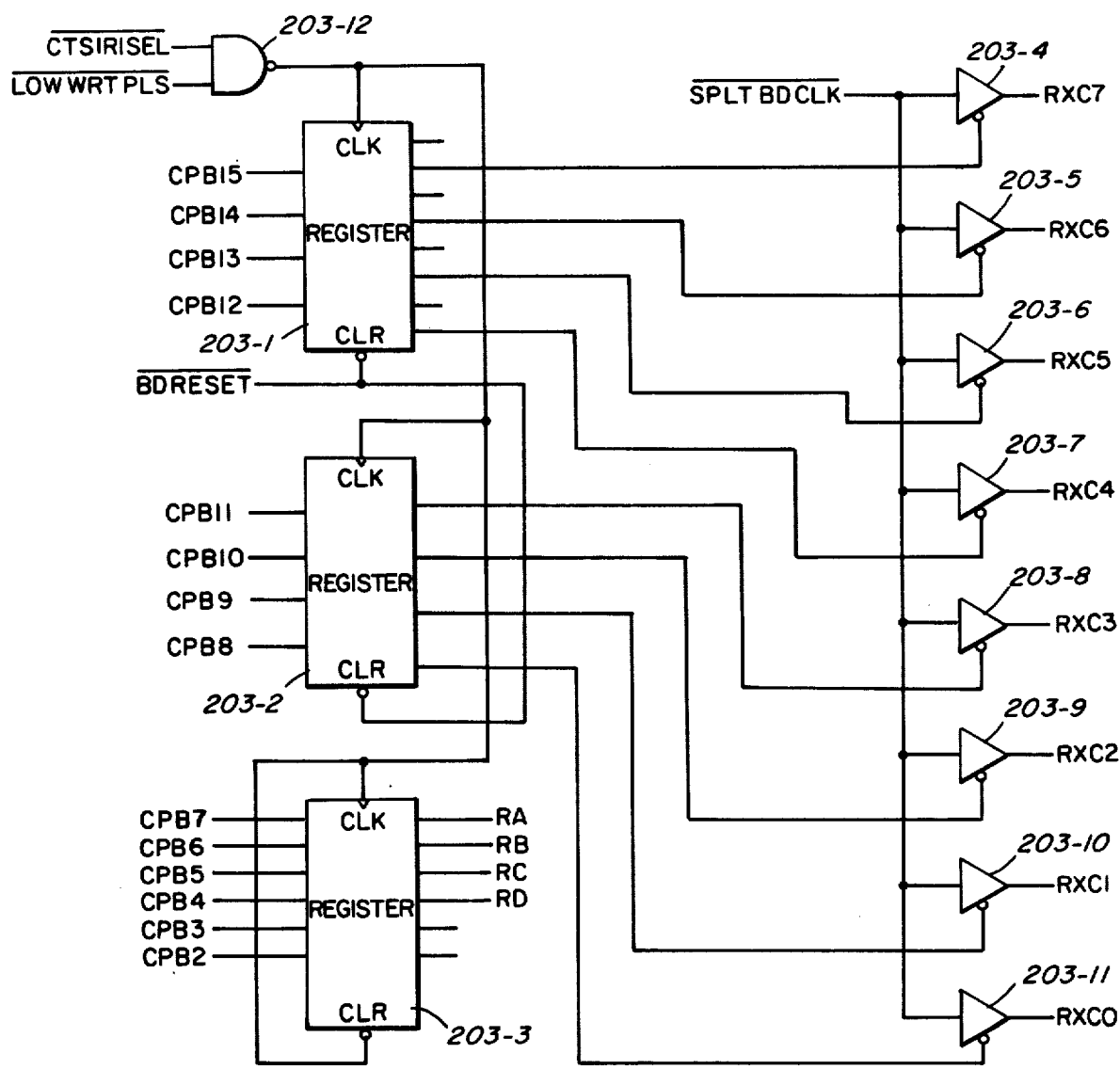
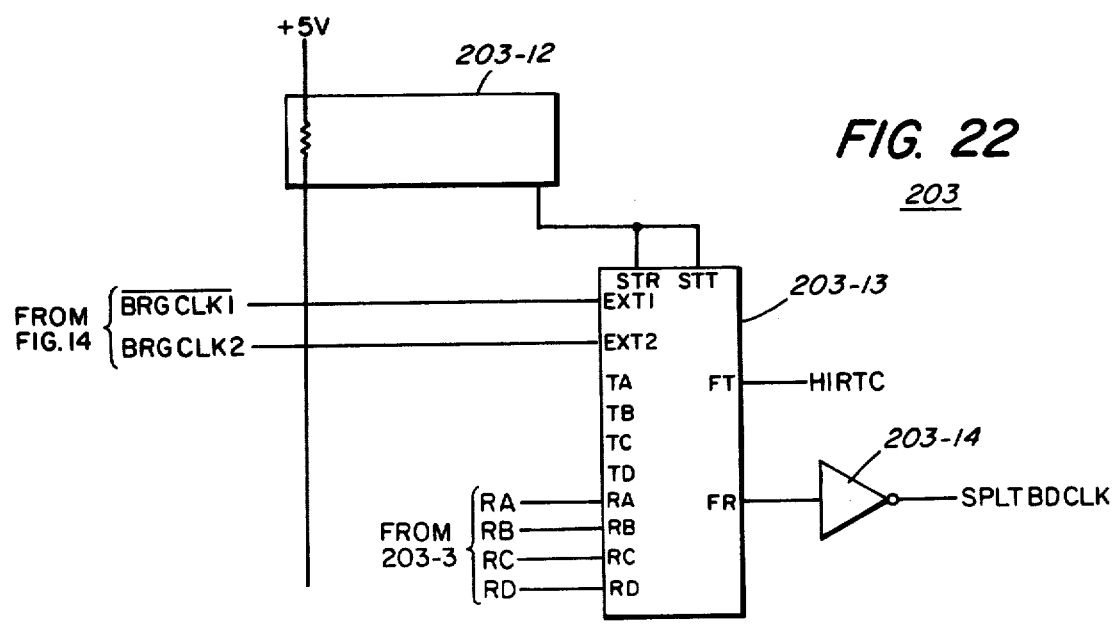
FIG. 22
203

COMMUNICATIONS CONTROLLER

BACKGROUND OF THE INVENTION

The present invention relates generally to communications controllers and more particularly to a communications controller for use in operably coupling a plurality of input/output (I/O) devices to a host central processing unit (CPU).

Data processing systems typically include a CPU, a main memory and one or more I/O devices (commonly referred to as peripheral devices). The I/O devices are usually connected to the CPU through adapters which convert the parallel data received from the CPU into serial data for transmission to the proper I/O device and the serial data received from the I/O devices to parallel data for transmission to the CPU. The adapters are often connected to the CPU through an auxiliary processor which performs certain types of data processing that would otherwise be performed by the CPU. As a result, the CPU has more time to access and process data contained in the main memory.

In U.S. Pat. No. 4,075,691, to Davis et al there is described a control unit for connecting a plurality of peripheral devices to a main CPU. The control unit is comprised of three major sections: (1) A direct memory access module (DMA) for communicating with the memory of the CPU; (2) A serial interface adapter module (SIA) for converting parallel data to serial data for transmission to a peripheral device and serial data to parallel data on receiving from a peripheral device; and (3) A programmable controller module (PCM) connected between the DMA and SIA for providing the overall control of message reception and transmission. The PCM comprises a small special-purpose programmable parallel computer. A program (firmwave) stored in a read-only memory of the PCM enables the PCM to handle the different communication disciplines observed by various peripheral devices operable with the control unit.

SUMMARY OF THE INVENTION

A communications controller for use in coupling a plurality of input/output (I/O) devices to a host central processing unit (CUP) for controlling the transfer of data between said plurality of (I/O) devices and said (CPU) and performing character processing on the data received from the plurality of (I/O) devices as well as other data processing according to the principles of the present invention comprises a central processor bus, a host interface section for providing a communication link between the central processor bus and the host (CPU), a processor unit for controlling the operations of the controller, the processor unit including a data manipulation processor section and a control processor section, memory section for providing local read/write storage for the processor, a communications interface section for interfacing the controller with the plurality of (I/O) devices and a status section for providing status indicating signals to the processor unit.

BRIEF DESCRIPTION OF THE DRAWINGS

While the novel features of this invention are set forth with particularity in the appended claims, the invention both as to organization and content will be better understood and appreciated along with other objects and features thereof from the following detailed description taken in conjuction with the drawings in which like reference numerals represent like parts and wherein:

FIG. 4 is a circuit diagram of circuitry included in the real time clock circuit 450 shown in FIG. 2;

FIG. 7 is a circuit diagram of circuitry included in the refresh timer 455 shown in FIG. 2;

FIG. 8 is a circuit diagram of circuitry included in the data channel data latch 103 section shown in FIG. 2;

FIG. 13 is a circuit diagram of circuitry in the ACIA control and select logic unit 202 and the ACIA data latch unit 203 shown in FIG. 2 in the auxiliary timing generator 312;

FIG. 15 is a circuit diagram of circuitry in the instruction register 308 as shown in FIG. 2;

FIG. 20 is a circuit diagram of circuitry in the row address register 405 as shown in FIG. 2;

FIG. 22 is a circuit diagram of circuitry in the split baud selection unit 203 as shown in FIG. 2;

DETAILED DESCRIPTION OF PREFERRED EMBODIMENT

The present invention is directed to a communications controller for use in connecting a plurality of I/O devices to a host CPU and which is designed and programmed to perform functions which include (1) controlling the transfer of data between the I/O devices and the CPU, (2) performing character processing on the data received from the I/O devices, (3) changing the BAUD rates at which data is transmitted to and from any one of the I/O devices and (4) changing the characteristics of any communication line. The term "character processing" as used herein means processing which involves changing previously input data or characters from an I/O device before transmission to the host CPU based on previous or subsequenct characters from the same I/O device. This type of processing is commonly referred to as "editing".

Although the invention will hereinafter be specifically described with respect to a controller that is asynchronous for use with asynchronous I/O devices it should be understood that the invention is not limited thereto, but rather may be in the form of a sychronous type controller for use with synchronous type I/O devices.

Figure 1:
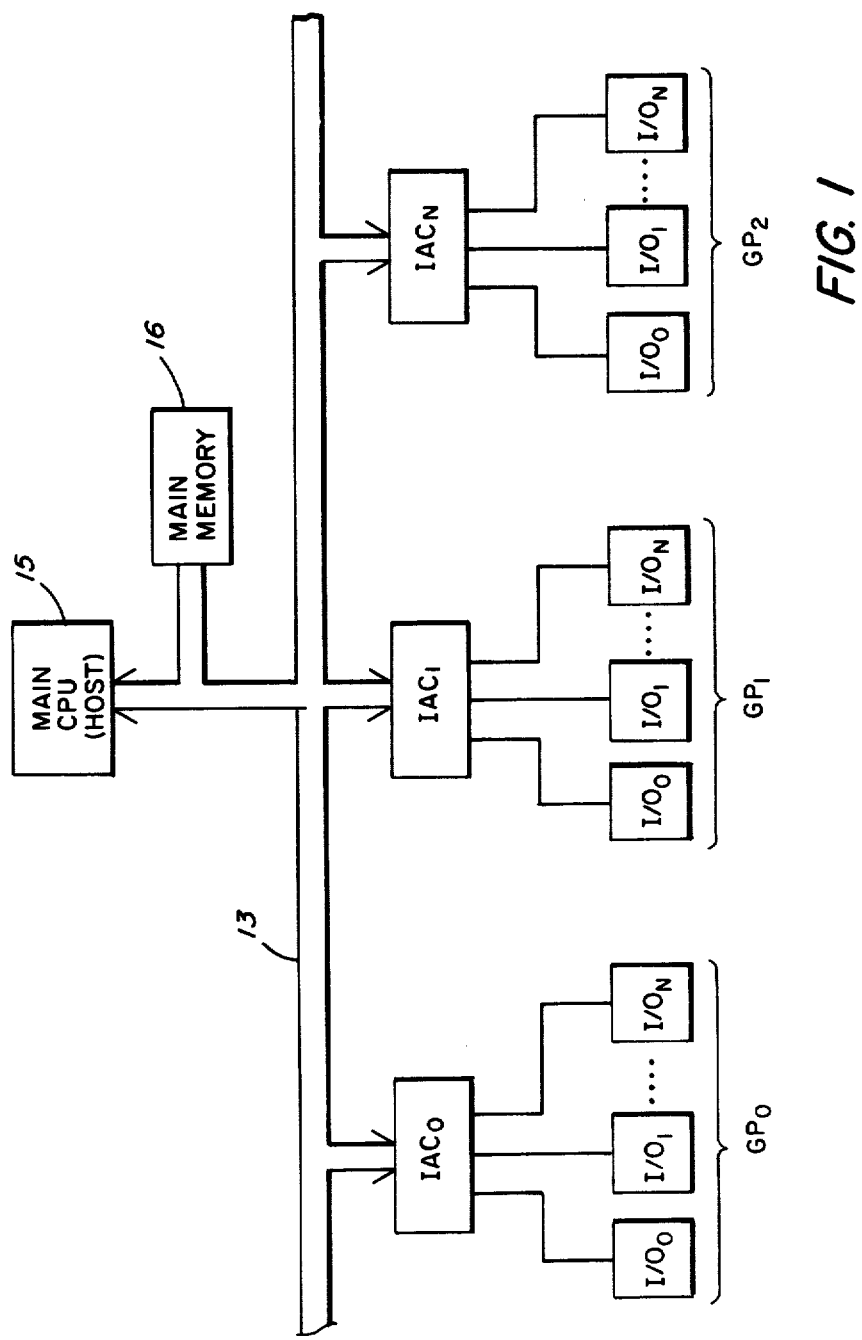
FIG. 1 is a block diagram of a data processing system in which an illustrative embodiment of the present invention is employed.

Referring now to FIG. 1 there is illustrated a data processing system constructed according to the teachings of the present invention and identified by reference numeral 11.

Data processing system 11 includes a plurality of groups of input/output devices, the groups of devices being labelled $GP_{100}$, $GP_1$ and $GP_N$. Each group GP comprises a plurality of input/output (peripheral) devices three of which are shown for illustrative purposes and labelled $I/O_{100}$, $I/O_1$ and $I/O_N$. The input/output devices in each group GP are individually connected in parallel to an intelligent asynchronous controller (IAC), the IAC's being labelled $IAC_{100}$, $IAC_1$ and $IAC_N$. The IAC's in turn are connected through a host I/O bus 13 to a main or host computer (CPU) 15 which has associated with it a main memory 16. The host CPU may be, for example, a Data General Eclipse MV/80000 TM computer. The I/O devices may be for example, Data General Dasher D1000 terminals or Bell Model No. 103 Modems. In the specific implementation disclosed, each IAC may be operably connected to either sixteen terminals or eight modems. However, in each case the exact number of units is not to be considered as being a part of the invention.

Figure 2A:
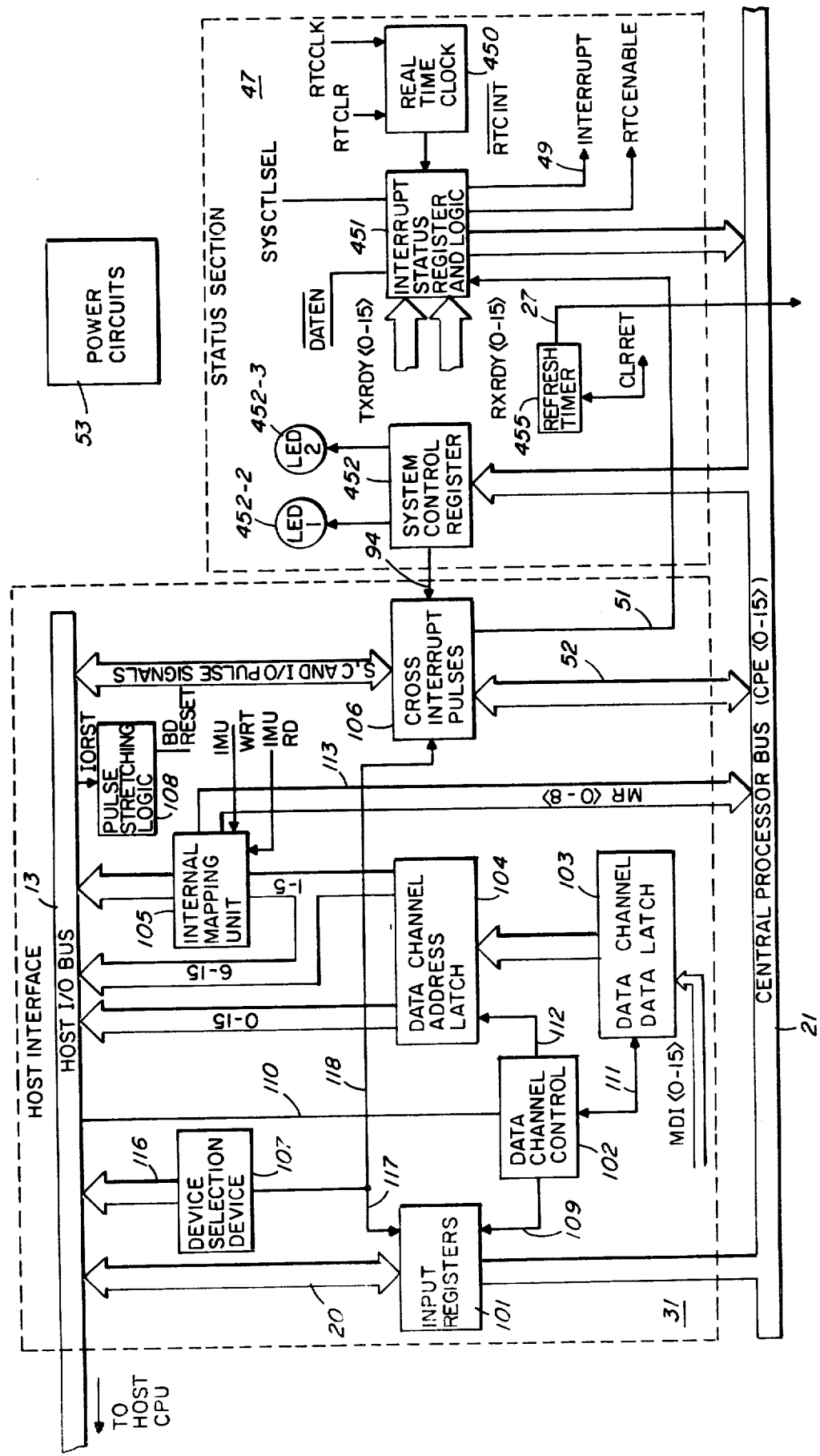
FIG. 2, parts (a), (b) and (c) is block diagram of the IAC shown in FIG. 1.
Figure 2B:
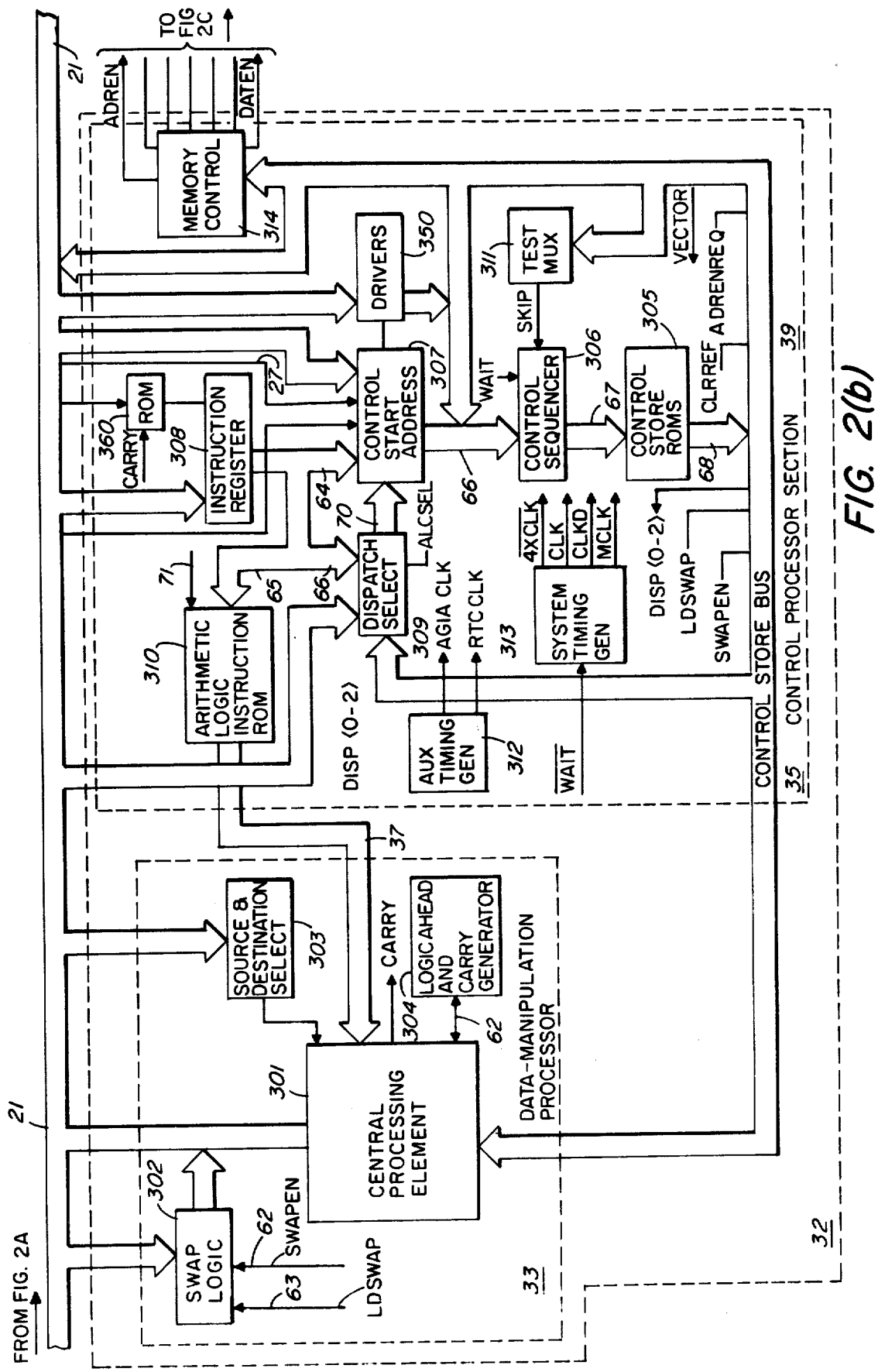
Figure 2C:
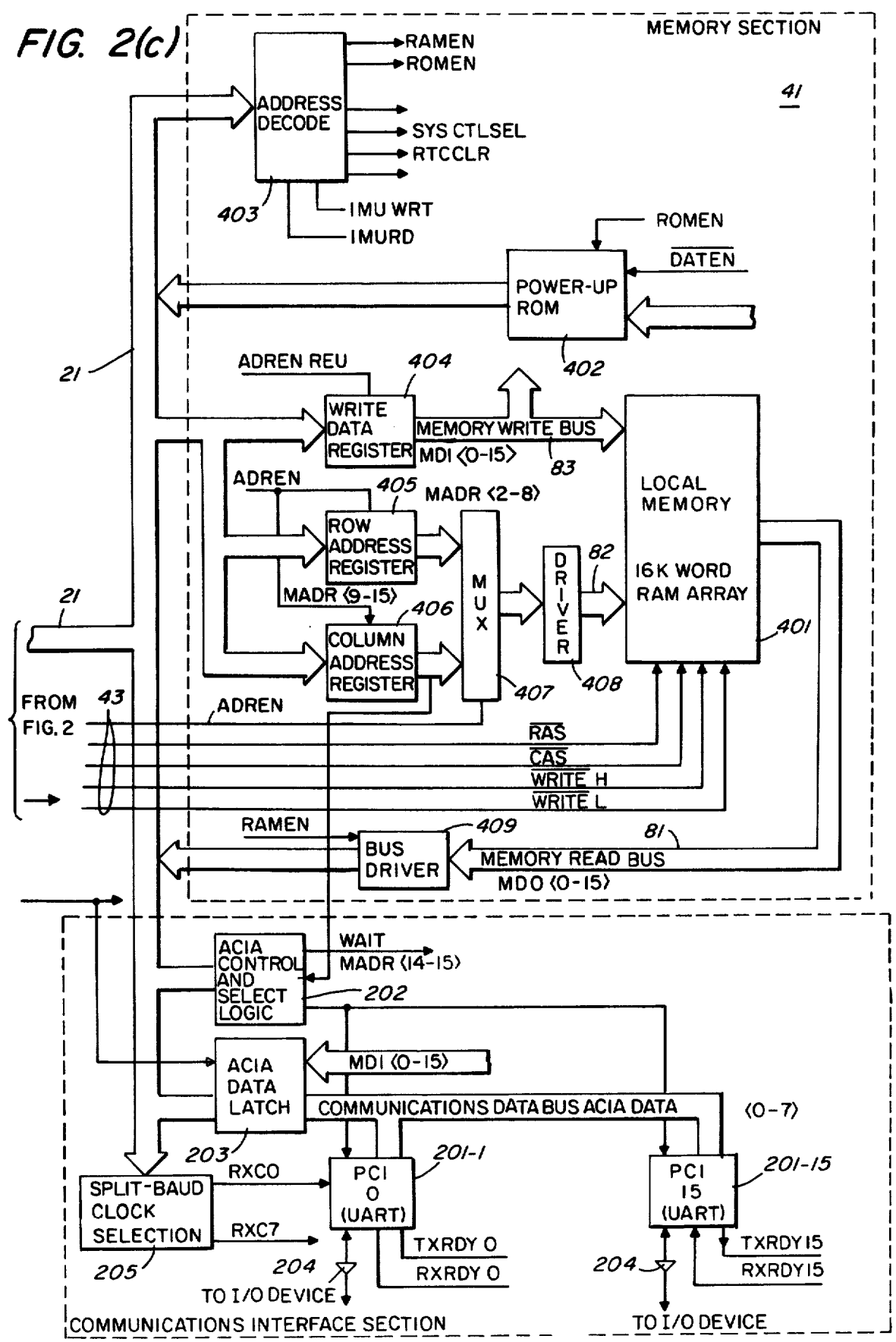

Referring now to FIG. 2, there is illustrated a block diagram of one of the IAC's.

The IAC is comprised of a number of sections which are interconnected by a 16 bit central processor bus 21 which is internal to the IAC.

There is a host interface section 31 which interfaces the central processor bus 21 with the HOST I/O bus 13 and serves as the communication link to the HOST I/O bus 13. There is a 16 bit processor 32 which performs various operations including character processing and which is made up of a data-manipulator processor section 33 (which is sometimes referred to in the art as an arithmetic logic unit) which performs data or character manipulation and a control processor section 35 (which is sometimes referred to in the art as a microsequencer) which controls the operation of the data manipulation processor 33. Control processor section 35 is intimately connected to data manipulation processor 33 through a connecting link 37 and a control store bus 39.

There is a memory section 41 whose basic purpose is to provided local read-write storage for control processor 35. Memory section 51 also provides some read only storage (non-volatile storage) for use on power up. In addition to being connected to central processor bus 21, memory section 41 is connected by control lines 43 to control processor 39. There is a communications interface section 45 which communicates with central processor bus 21 through memory section 41 with control processor 35 and with the I/O devices coupled to the IAC. The main purposes of communications interface section 45 is to provide the serial to parallel conversion necessary between control processor section 35, which is a parallel processor, and the serial lines coming into and going out of the IAC from the I/O devices. As can be seen, for each I/O device coupled to the IAC, there is a single input line identified RXRDY and a single output line identified TXRDY.

There is a status section 47 which provides certain status indications to the remainder of the IAC. Status section 47 has miscellaneous linkages to the various other sections, predominantly through its interrupt line 49 to the control processor section 35 and refresh request line 51 which also goes to the control processor section 35. There is also linkage from the status section 47 to the host interface section 31 through a line 51 to provide a signal that the host CPU wishes to communicate with the IAC.

Finally, there is a power circuits section 53 which provies the voltages, such as $-12$ volts, which may not be obtainable (i.e. not available) from the host CPU 15.

The host interface section 31 includes a set of input registers 101, a data channel control logic section 102, a data channel data latch section 103, a data channel address latch 104, an internal mapping unit logic secion 105, a cross interrupt logic 106 unit section, a device selection logic unit section 107 and a pulse stretching logic unit section 108.

The input registers section 101 provides the means by which parallel data from the host CPU 15 can be stored temporarily for reading by the data manipulation processor 33 and accordingly is connected to the host I/O bus 13 through a bus 20 and to the internal central processor bus 21. The registers section 101 (which includes appropriate receivers), receives instructions from the data channel control logic section 102 over lines 109, telling it when the data channel data is on the host I/O bus 13. Data channel control section 102 communicates with the host I/O bus with certain data channel signals over lines 110. In controlling the data channel operation, data channel control logic 102 sends signals to input registers 101 over lines 109. Data channel control logic 102 also communicates with data channel data latch 103 and the data channel address latch 104 over lines 111 and 112 respectively sine it must tell these latter units when to operate.

The data channel data latch 103 traps data destined for the host memory. The data channel data latch 103 is connected to the central processor bus 21 and is also connected to the data address latch 104. The data channel address latch 104 is used to trap the address in the host memory to which the data is being sent. In addition to receiving data from data channel data latch 103, data channel address latch 104 receives control information from data channel control logic 102 over lines 112, communicates with the host I/O bus to send its address information an communicates with the internal mapping unit 105. .

In many cases, the data channel data latch 103 is set in a "transparent" mode such that when an address is being written to the data channel address logic 104 it will simply pass through the data latch directly as if the data latch were not there.

The internal mapping unit 105 communicates with the data channel address latch 104 and performs certain address translations. It is capable of translating the most significant five bits of an address into seven to nine bits to be applied to the host I/O bus. Thus, the internal mapping unit 105 communicates with the host I/O bus and the data channel address latch 104. Internal mapping unit 105 also communicates directly with the central processor bus 21 over lines 113 for verification of its contents and with the control processor 35 over line 114. The signal sent over line 114 is used as a control signal to assist in the writing of the contents of the internal mapping unit 105. The contents of the internal mapping unit 105 are not hardwired but, rather, are programmed from the control processor section 35.

The purpose of the cross interrupt logic 106 is to trap certain control pulses from the host I/O bus. In other words, the host CPU may send over the host I/O bus certain predefined control signals standard to the particular host CPU being used and these pulses will be trapped by the cross interrupt pulse logic 106. Cross interrupt pulse logic also provides over line 51, as noted before, a signal that a particular one of the flags within the cross interrupt pulses logic has been recently set. The cross-interrupt pulses logic 106 communicates with central processor bus 21 in both directions over lines 52 so that the status of the flags can be read and also so that the IAC can manipulate the flags, especially the BUSY and the DONE control signals.

Devices selection logic unit 115 communicates with the host I/O bus 13 over lines 116, with the input registers unit 101 over lines 117 and with the cross interrupt pulses logic unit 106 over lines 118. The purpose of the device selection logic unit 115 is to identify to the input registers 101 and the cross interrupt logic 106 that the I/O command currently present on the host I/O bus 13 is directed towards this particular IAC and not another one of the IAC's. There is a field that goes out on the host I/O bus 13 called the "device select lines" that contains a six bit field. The device selection logic 115 compares this field against a preselected code wired into switches on the IAC. If the code corresponds to the particular IAC, the device selection unit 115 sends a signal to the input registers 101 over lines 117 to load its registers. On the other hand, if it is not the proper code, the device selection logic unit 115 informs input registers 101 that it should not load its registers.

The communications interface section 5 comprises a plurality of programmable controller interface (PCI) units labelled 201-1 through 201-15. Each PCI is adapted to be connected to a single I/O device, the particular number of PCI's employed being limited by the throughout of the processor, typically measured in characters per second. Each PCI includes a UART (i.e. universal asynchronous receiver/transmitter). The UART's serve as the serial to parallel converters for the serial input/output lines connected to the various I/O devices. The communications interface section 45 further includes an ACIA control and select logic unit section 202 and a ACIA data latch section 203 which together interface the UART's with the central processor bus 35, a plurality of drivers and receivers labelled 204 for interfacing the UART's 201 to their respective I/O devices and a split-BAUD clock selection unit 205. If the lines being communicated to by the drivers 204 are modem lines, the split BAUD clock section unit 205 provides an alternate source for the receiver clock rate. As is known, in certain systems employing modems it is economical to transmit the data that is transmitted at one speed and receive the data at another speed. The split Baud clock selection unit 205 provides an additional set of clock sources to perform these functions. The actual clock rate is software determined. Therefore, there is logic in the split-BAUD clock selection unit 205 to receive from the central processor bus 21 information concerning the clock rate desired and the particular channels (UART's) to which the clock rate should be directed. For example, it may be desired and specified that channels 2 and 5 (i.e. the channels containing UART's 201-2 and 201-5) are to operate at split BAUD and should operate at 300 BAUD while the other channels can operate at the same transmit and receive rate.

It is to be noted that if the PCI's are to be connected to modems rather than directly to I/O devices, the number of PCI's utilized is eight rather than sixteen, in the specific implementation herein described. Thus, only eight transmit and receive control lines are shown coupled to the split BAUD clock selection unit.

Data manipulation processor section 33 and control processor section 35 together provide the intelligence for operating the IAC.

The data manipulation processor section 33 comprises a central processing element 301, a swap logic circuit 302, a source and destination select circuit 303, and a look ahead and carry generator logic circuit 304.

The central processing element 301 performs the arithmetic and logic operations associated with manipulating data (i.e. adding, subtracting, ANDing ORing etc.). The central processing element 301 produces 16 bit wide data and by virtue of this is connected to the central processor bus 21. The central processing element 301 also receives data from the control store bus 39 and control information from control processor section 35 over lines 37. Furthermore, the central processing element accepts information from the source and destination select circuit 303 over line 61 informing it as to register designations. The central processing element 301 includes 16 bit wide registers and the source and destination select circuit 303 simply informs the central processing element as to which should be the source of any one operation and which should be the destination.

Look ahead carry generator 304 communicates with the central processing element 301 over lines 62 and essentially provides a speeding up of the carry logic. For example, in adding two numbers this circuit will perform some processing to speed the propogation of a carry bit throughout the 16 bit words.

The swap logic section 302 has a path coming in from the central processor bus 21 and a path communicating out onto the central processor bus 21. The swap logic section 302 swaps the two halves of the 16 bit word. It has storage within it and in some respects is a register. It also has built in drivers so that the swapped version of this data can be enabled back onto bus 21 at a later time. The swap logic section 302 receives control signals from the control processor section 39 over two lines 62 and 63, one line 62 telling it when to take data off of the central processor bus 21 and the other line 63 to tell it when to put swapped data back onto central processor bus 21. The source and destination select circuit 303 generates address or register source and destination bits off of the central processor bus 21 which are applied as another input to central processing element 301 over lines 61.

Control processor section 35 formally controls the data manipulation processor section 33 and includes a set of control store ROM's 305, a control sequencer 306, a set of control starting address ROMS 307, an instruction register 308, a set of dispatch select ROMS and logic circuit 309, an arithemtic and logic instruction ROM 310, a test multiplexor 311, an auxiliary timing generator 312, a system timing generator 313, a memory control unit 314 and a high constant ROM 360.

Instruction register 308 is in "one way" communication with central processor bus 21 and is the instruction register in which the instruction is placed after it has been fetched from memory section 41. The instruction register 308 then feeds the control start address ROM's 307 over bus 64 and also selectively provides some input into the arithmetic logic and instruction ROM 310 over bus 65 and to the dispatch and select logic 309 over bus 66. The control start address logic 307 examines the contents of the instruction register 308 and from that determines an appropriate starting address for the control memory 314. The address, generated by control start address 307 is then passed on to the control sequencer 306 over bus 66.

At this point the control sequencer 306 takes control of the control processor section 35 and start generating the proper sequence of microinstructions which are the outputs of the control store ROMS 305. As can be seen, control sequencer 306 communicates with control store Roms 305 over bus 67 and the control store ROMS 305 communicate with the control store bus 39 over bus 68. Thus, the control sequencer 306 actually answers an address register for the ROMS. The control sequencer 306 accepts as an input the starting address and also accepts as inputs signals from the test multiplexor 311 over line 69 which tell control sequencer 306 either to increment (i.e. point to the next sequential instruction) or to branch the instruction whose address has been placed onto BR$\phi$-8. The control sequencer 306 also accepts as an input a total of eight lines that are generated from the control store ROMS 305 and are sent into the control sequencer 306 from control store ROMS 305 over control store bus 39.

The control store ROMS 305 provides primarily the plurality of control signals required by the data manipulation processor 33 and also feeds into the memory control logic 314.

The dispatch and select logic 309 selects a bank of the control start address ROMS and performs some processing for enabling the proper starting address. As such, the dispatch and select logic 309 communicates with the control start address ROM 307 over bus 70 and also communicates with the instruction register 308 over bus 66.

Arithmetic logic instruction ROM 310 communicates with the instruction register 308 over a line 71 and with the central processing element 301 in the data manipulation processor 33 over bus 37.

The auxiliary timing generator 312 produces ACIA clock signals which are used by the communications interface section 45. The system timing generator 313 provides all the clocks used by the logic in the IAC, except for the clock used in communications interface 45. System timing generator 313 has as its input a signal called $\overline{\text{WAIT}}$ which is produced by the UARTS in the control processor section 35. When asserted, $\overline{\text{WAIT}}$ will freeze certain clocks necessary to insure the proper operation of the relatively slow UART's.

Memory control circuit 314 takes as inputs information from the control store ROMS 35 over control store bus 39 in the form of control signals and produces all of the subsequent control signals necessary to coordinate the operation of memory section 41 with the remainder of the IAC. The high constant ROM 360 accepts as inputs signals from the control store ROM 305, the instruction register 308 and a signal called CARRY from the central processor element 301.

Memory section 41 comprises a local memory 401 which contains 16K words of dynamic memory. It also contains a power up ROM 402, an address decode logic 403, a write data register 404, a row address register 405, a column address register 406, a multiplexer 407, a set of drivers 408 and a set of drivers 409.

Local memory 401 receives a row address select control signal called $\overline{\text{RAS}}$, a column address select control signal called $\overline{\text{CAS}}$, a write high control signal $\overline{\text{WRITE H}}$ which initates a write of only the top 8 bits of each 16 bit word and a write low control signal called $\overline{\text{WRITE L}}$ which initiates a write of only the low 8 bits of each 16 bit word. The data coming out of local memory 401, which is MDO<$\phi$-15> is sent to bus driver 409 over lines 81. Local memory 401 accepts as inputs, address information provided by driver 408 over lines 82, data from write data register 404 over line 83 which is received from central processor bus 21.

The row address register 405 accepts data from the central processor bus 21 and produces a total of 7 bits which becomes a row address. The 7 bits of row address information are applied to multiplexer 407. Multiplexer 407 also accepts as an input, data from column address register 406. Multiplexer 407 also has an input the control signal ADREN which is generated by the memory control unit 314 in the central control processor section 35. The signal tells the multiplexer 407 exactly when to trap the address in the address registers 405 and 406. Multiplexer 408 drives driver 408 which provides the multiplexed address to local memory 401.

Bus driver 409 accepts as input, the output of local memory 401 and from there communicates with central processor bus 21 to buffer the information from local memory 401 onto central processor bus 21. Bus driver 409 also accepts as a control signal a signal called RAM enable ($\overline{\text{RAMEN}}$) which it receives from the address decode logic section 403.

The function of address decode section 403 is to provide gross decoding of the memory address. Within the memory spectrum, the local memory 401 occupies only one half of the 32K available addresses. Accordingly, the address decode section 403 makes a basic determination if the address being presented is the local memory 401 or the power up ROM 402 or merely a dummy address to clear out the real time clock.

The power up ROM 402 accepts as inputs, MADR, which is actually the outputs of row address register 405 and column address register 406. These inputs are accepted in parallel and not multiplexed as is the case with the local memory 401. Power up ROM also accepts as an input a signal called $\overline{\text{DATEN}}$ which is receives from memory control logic 314 and a signal called ROM enable or ROMEN from address decode 403. The output signals consist of macroinstructions (i.e. microinstructions which will be loaded into instruction register 308) as opposed to microinstructions (which will be generated by control store ROMS 305 based on the content of instruction register 308). Power up ROM 402 may comprise 512 locations in which the macroinstructions may be placed, typically, for power up testing and enables shutting down of the IC if there appears to be something wrong with the IAC. Power up ROM 402 is connected via a one way bus 81 to the central processor bus 21.

The sections 47 includes a real time clock 450 which includes an oscillator. The real time clock 450 accepts an input RTCLR from the address decode unit 403. The purpose of this signal is to reset the real time clock.

Since this signal is originating from the address decode 403, when the proper address is hit, the signal will be generated and automatically clear out the real time clock.

The real time clock 450 provides inputs to an interrupt status register and logic circuit 451 over lines 600. The interrupt status register and logic circuit 451 takes as inputs receiver ready signals RXRDY$\phi$-15 from the UARTS in the communications interface section 45, and transmitter ready signals TXRDY$\phi$-15 also from the UARTS in the communications interface section 45. These signals are defined as causes for interrupt, interrupting the processor combination consisting of control processor 35 and data manipulation processor 33. The interrupt status register and logic unit 451 also accepts a signal, which is the busy flag from the cross interrupt pulse circuit 106 in host interface section 31 over a line 51. This signal also serves as an interrupt signal for the two processors 33 and 35. The output line 49 of interrupt status register and logic unit 451 is the interrupt line which feeds into the control start address ROM 307 in the control processor section 35. This unit is also capable of driving the central processor bus 21 through a one way bus 92 so that the states of all these various signals may be viewed.

The status section 47 further includes a system control register 452 which receives inputs from central processor bus 21. The system control register 452 drives a pair of light emitting diodes 453 and 454 and also communicates with cross interrupt logic 106 over lines 94 to help control the states of the various flags. Finally, status section 47 includes a refresh timer 455 which times out requests for refreshing the local memory 401. It provides these requests to the control starting address logic 307 and can be reset by a signal from the control store bus 39.

Power supply circuits 53 provides several voltages such as −12 volts which might not be otherwise available.

Figure 3:
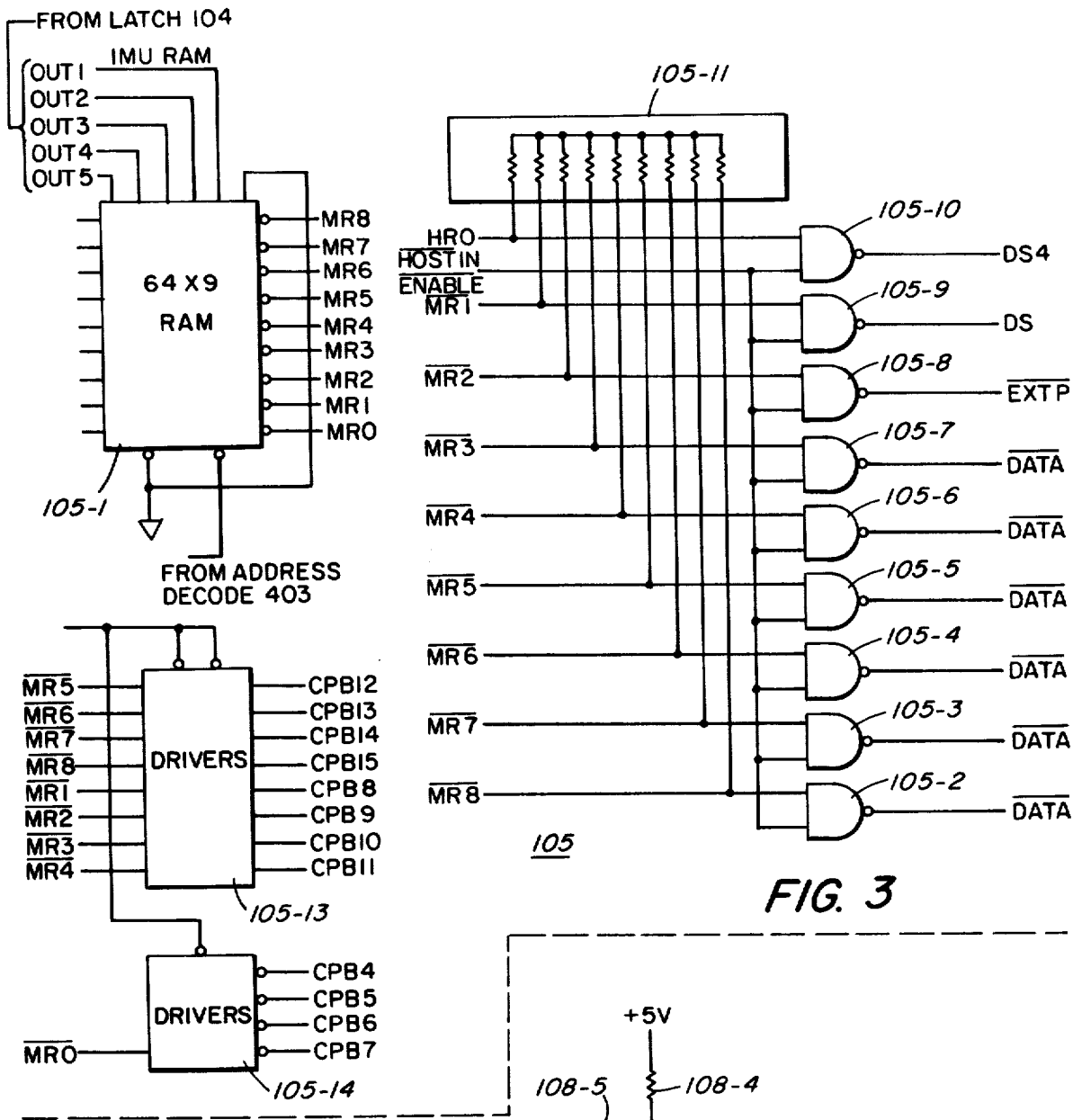
FIG. 3 is a circuit diagram of circuitry included in the internal mapping unit 105 shown in FIG. 2.

Referring now to FIG. 3, there is illustrated a circuit diagram of circuitry included in the internal mapping unit 105. The circuit includes a 64 location by 9 bit wide RAM 105-1. The RAM 105-1 has as address inputs the top 5 bits of a 15 bit logical address. These inputs are applied through OUT lines 1 through 5 and are obtained from the data channel address latch unit 104. RAM 105-1 also accepts data inputs OUT 7 through OUT 15 from address latch unit 104 and produces as outputs signals $\overline{MR\phi}$ through $\overline{MR8}$. Signals $\overline{MR\phi}$ through $\overline{MR8}$ are passed through drivers 105-2 through 105-10, respectively, which are under the control of signal $\overline{HOST\ IN\ ENABLA}$. Drivers 105-2 are in the form of NAND gates. The outputs of drivers 105-2 through 105-10 are sent to the host I/O bust 13. A set of pull-up resistors 105-11 are also connected to signal lines $\overline{MR\phi}$ through $\overline{MR8}$, the pull up resistors being necessary since RAM 105-1 also receives a write enable input signal over line 105-12 from the address decode unit 403.

Internal mapping unit 105 further includes a pair of drivers 105-13 and 105-14 that allow the outputs MR$\phi$ through MR8 to be gated on to the central processor bus 21.

Referring now to FIG. 4, there is illustrated a circuit diagram of circuitry included in the real time clock circuit 450. The circuitry includes a pair of 4 bit binary ripple counters 450-1 and 450-2 which are feeding a D type flip flop 450-3. When counters 450-1 and 450-2 driven by an oscillator overflow, flip flop 450-3 is clocked to the set state. The processor (sections 31 and 33) then can clear out the contents of the counters 450-1 and 450-2 and the flip-flop 450-3 through OR gate 450-4 and inverter 450-5. Also included in the real time clock 450 is an OR gate 450-6 which gates the interrupt.

Figure 5:
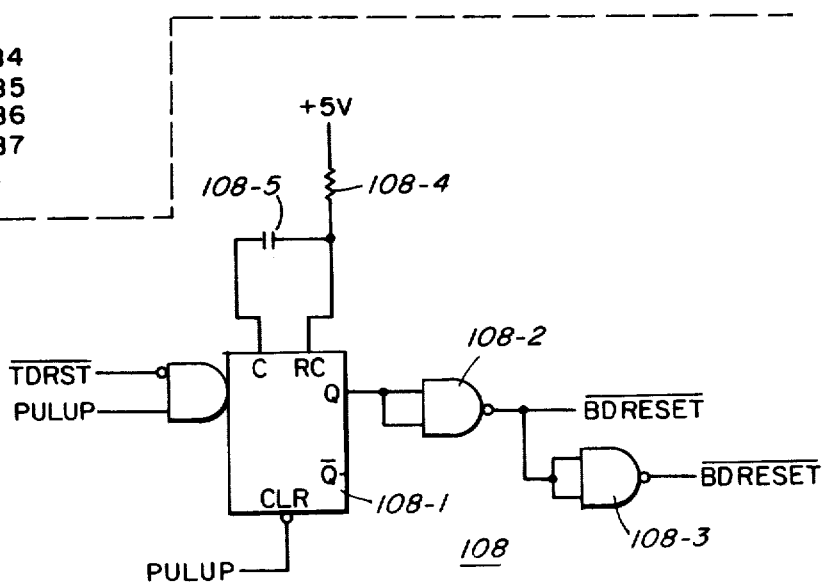
FIG. 5 is a circuit diagram of circuitry included in pulse stretching logic unit 108 shown in FIG. 2.

Referring now to FIG. 5, there is illustrated a circuit diagram of circuitry included in the pulse stretching logic 108. The basic function of pulse stretching logic 108 is to stretch an I/O reset pulse from the host computer to a predetermined minimum width. For example, if the pulse from the host computer is only 100 nanoseconds, pulse stretching logic unit 108 will strectch it to one microsecond as required by certain logic in the IAC. Otherwise, the particular logic may not react. Pulse stretching logic 108 includes a one-shot 108-1 (a monostable multivibrator), a pair of drivers 108-2 and 108-3 which are in the form of NAND gates, and a resistor 108-4 and capacitor 108-5 combination which are used to achieve the proper time constant. Pulse stretching logic 108 may be, for example a 74LS123 chip.

Figure 6:
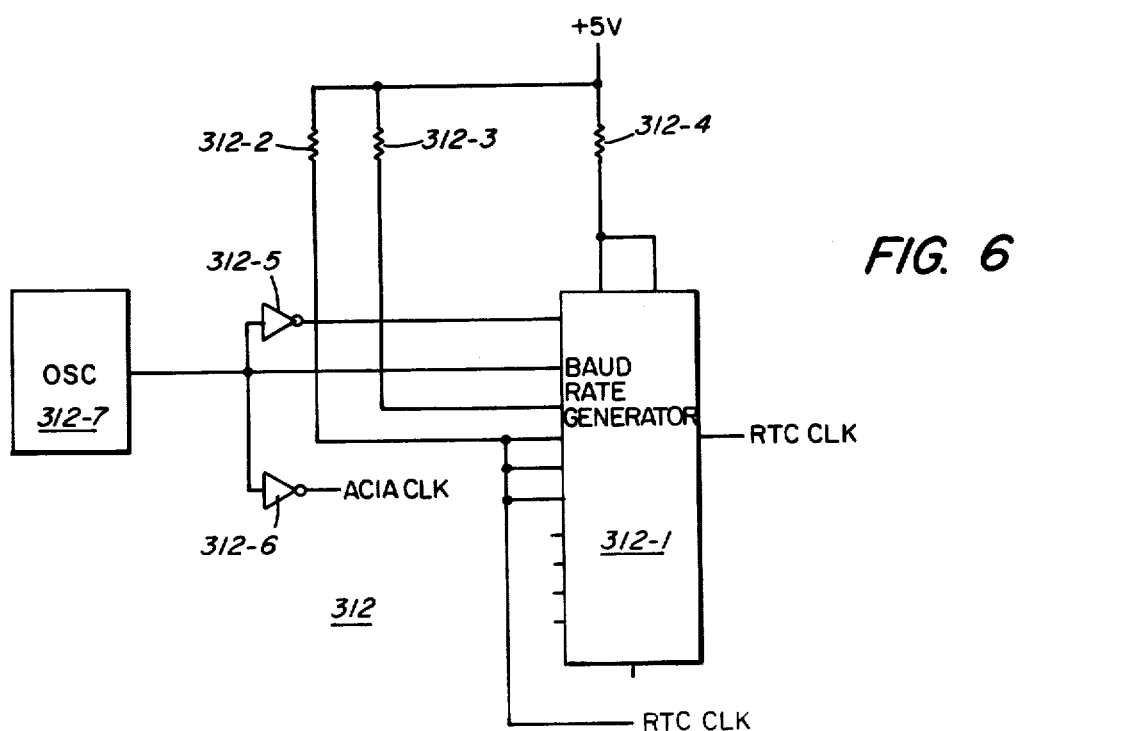
FIG. 6 is a circuit diagram of circuitry included in the auxiliary timing generator 312 shown in FIG. 2.

Referring now to FIG. 6, there is illustrated a circuit diagram of circuitry included in the auxiliary timing generator 312. The circuitry is essentially a "divide by" circuit and comprises a BAUD rate generator 312-1 and three resistors 312-2, 312-3 and 312-4, an oscillator 312-7 and two inverters 312-6 and 312-8. BAUD rate generator 312-1 accepts as inputs the buffered outputs of oscillator 312-7 and inverter 312-5 and divides them by a fixed constant which may be changed, as desired.

Referring now to FIG. 7, there is illustrated a circuit diagram of circuitry included in the refresh timer 455. The circuitry includes a pair of J-K type flip flops 455-1 and 455-2, a counter 455-3, a NOR gate 455-4, an inverter 455-5, an OR gate 455-6 and miscellaneous resistors 455-7 and 455-8. The purpose of refresh timer 455 is to produce a refresh request periodically, on the order of around 6 microseconds. As soon as the request is generated it is latched until the control sequencer 306 comes back with a clear refresh request signal to repeat the procedure. It essentially directs the control sequencer 306 to enter a refresh routine in microcode. The purpose of flip-flop 455-2 is to synchronize the request to the timing of the control sequencer 306.

Referring now to FIG. 8, there is illustrated a circuit diagram of circuitry included in the data channel data latch 103 and the data channel address latch 104. The circuitry in the data channel data latch 103 includes two 8 bit latches, 103-1 and 103-2. The circuitry in the data channel address latch 204 also includes a pair of 8 bit latches 104-1 and 104-2. Latches 103-1 and 103-2 take as inputs MDI$\phi$ through MDI15 from memory section 41. The outputs of latches 103-1 and 103-2 pass directly into latches 104-1 and 104-2. Normally, the information will pass directly through the latches without being stored. However, on signal $\overline{DCH\ DATA\ LATCH}$ from the data channel control unit 102 over line 111 the data will be sampled (i.e. trapped) by latches 103-1 and 103-2. On the other hand, latches 104-1 and 104-2 will trap information under two conditions, one on receipt of a signal from driver 104-3 that valid address information is presented at the inputs to drivers 104-1 and 104-2 and the other on receipt of a signal HOST DCHI from the host CPU that valid data information is present at the inputs of drivers 104-1 and 104-2. Those two conditions are transmitted to drivers 104-1 and 104-2 by OR gate 104-4.

The outputs from latches 104-1 and 104-2 feed into the internal mapping unit 105 except for lines OUT 6 through OUT 15 and also feed onto the host I/O bus 13 through a set of drivers 104-5 through 104-10 and a set of drivers 104-11 through 104-20. Drivers 104-5 through 104-10 is a series of drivers for bits $\phi$ through 5 which are enabled only when data is being transferred onto the host I/O bus 13. When an address is being transferred to the host I/O bus 13, then drivers 105-2 will provide that information. If drivers 104-5 through 104-110 are sourcing bits $\phi$-5 on the host I/O bus 13 then drivers 105-2 are not driving these bits. Drivers 104-11 through 104-20 are the drivers for bits 6 through 15 and are enabled when either data or an address is being presented. Drivers 104-5 through 104-20 are all high powered NAND gates.

Figure 9A:
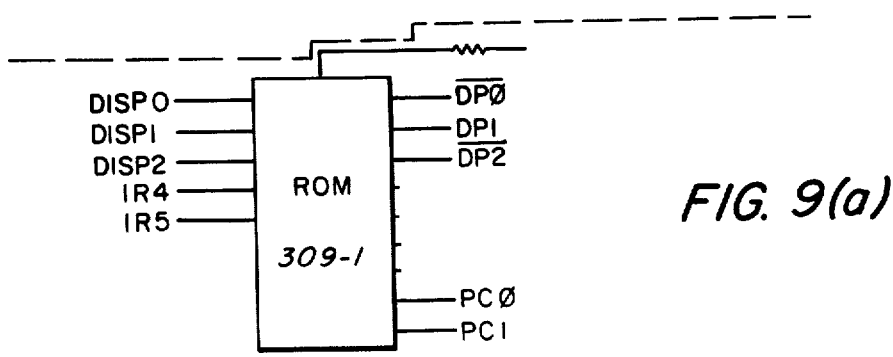
FIG. 9 is a circuit diagram of circuitry included in the dispatch select section 309 shown in FIG. 2.
Figure 9B:
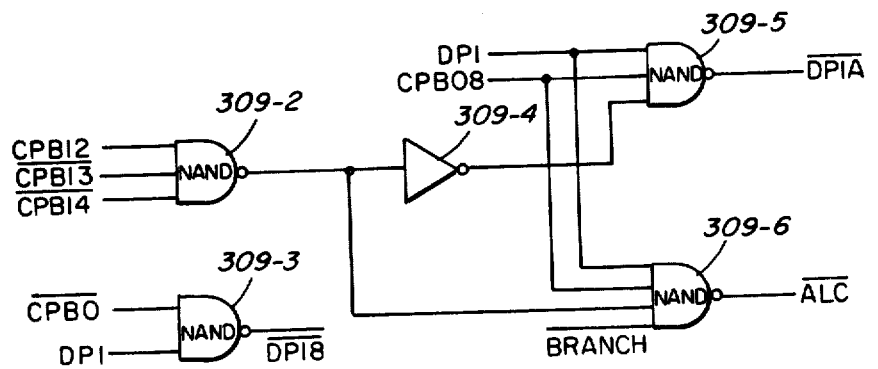

Referring now to FIG. 9 parts (a) and (b) there is illustrated a circuit diagram of circuitry included in the dispatch select section 309. This section, which is essentially a ROM circuit which is functioning, as a decoder, and includes a ROM 309-1, a first pair of NAND gates 309-2 and 309-3 an inverter 309-4 and a second pair of NAND gates 309-5 and 309-6. ROM 309-1 accepts as inputs DISP$\phi$ through DISP2 which are obtained from the control store ROMS 305 and also accepts as inputs IR4 and IR5. ROM 309-1 also provides outputs labelled $\overline{DP\phi}$, DP1 and $\overline{DP2}$ and PC$\phi$ and PC1. Outputs labelled DP$\phi$, DP1 and $\overline{DP2}$ are applied as control signals to the control start address logic 307. Outputs PC$\phi$ and PC1 are also applied to the control start address logic 307.

Figure 10B:
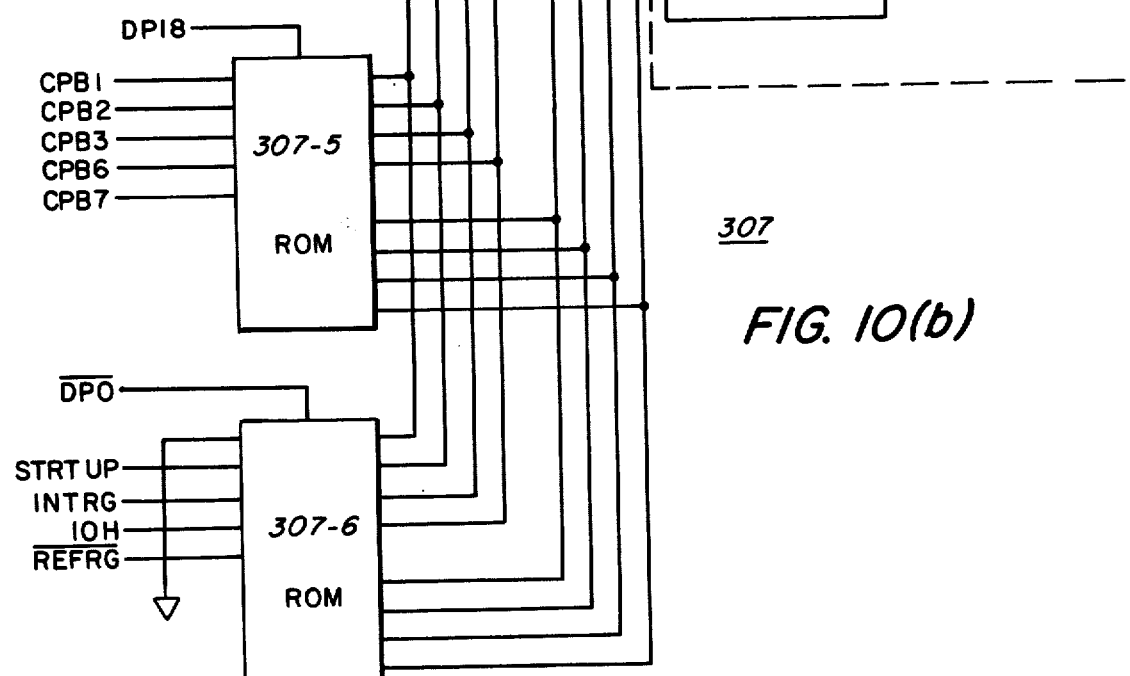
FIG. 10 is a circuit diagram of circuitry in the control start address section 307 and drivers 350 shown in FIG. 2.
Figure 10A:
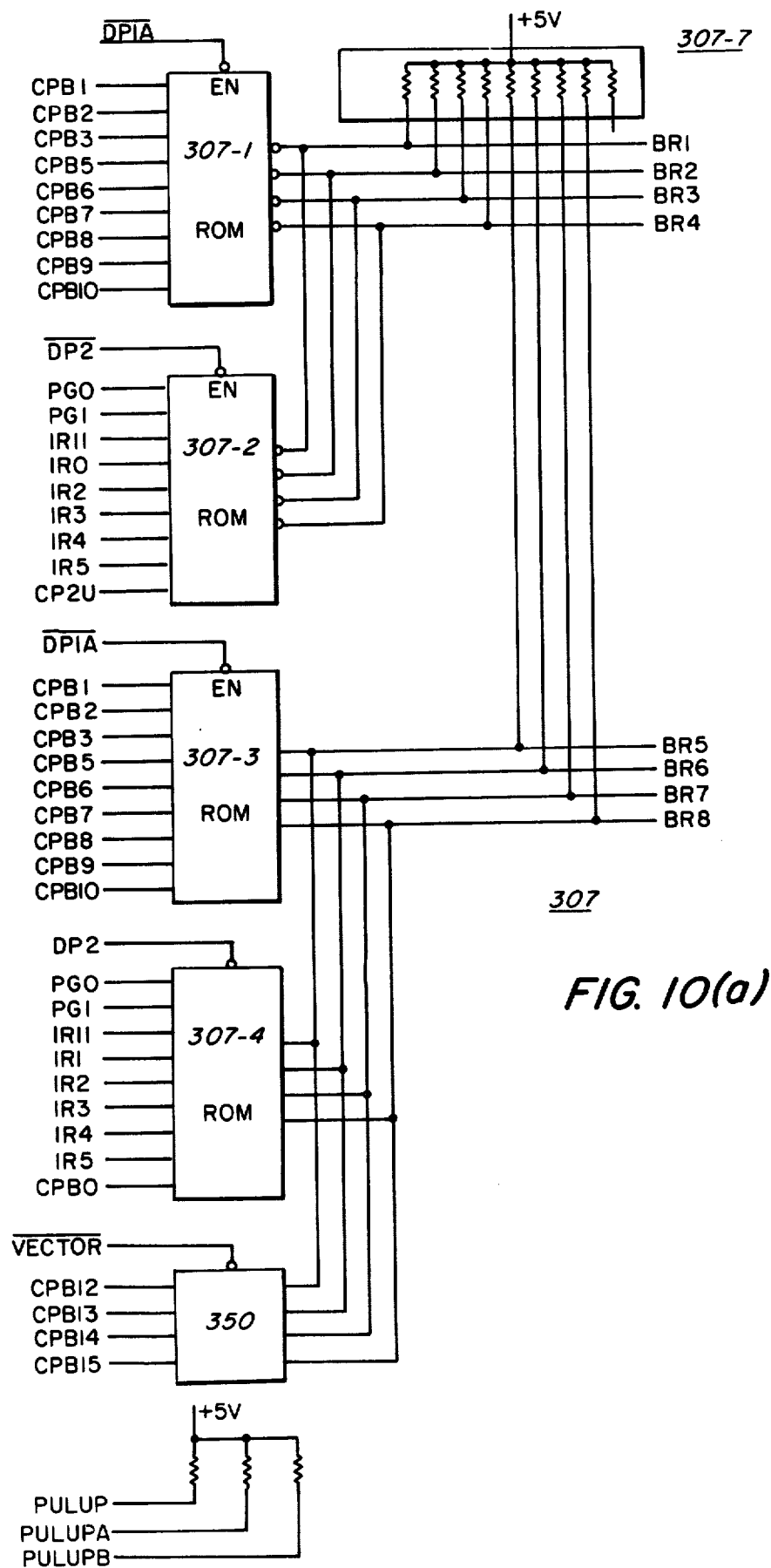

Referring now to FIG. 10 parts (a) and (b) there is illustrated a circuit diagram of circuitry in the control start address section 307 and drivers 350. The circuitry includes a set of ROMS labelled 307-1, 307-2, 307-3, 307-4, 307-5 and 307-6 and a set of pull-up resistors 307-7. These ROMS are starting address ROMS and are in a sense performing more decoding; however, in this instance it is of the instruction or at some times what is on the central processor bus 21. At points in time determined by the dispatch select logic 309, one or more of these ROMS are enabled to provide a starting address in microcode to be transferred to the control sequencer 306. At those points in time the individual ROMS provide the starting address either on the instruction being enabled or on the contents on central processor bus 21 at the time. ROMS 307-1 through 307-6 are preferably, 512 words by 4 bits. Drivers 350 accept 4 bits from the central processor bus 21 and acts as a gate to allow them onto lines BR5 through BR8 (which are the outputs of ROM 307-3) and basically allows the IAC to alter the starting address based on data present on control processor 21.

Figure 11:
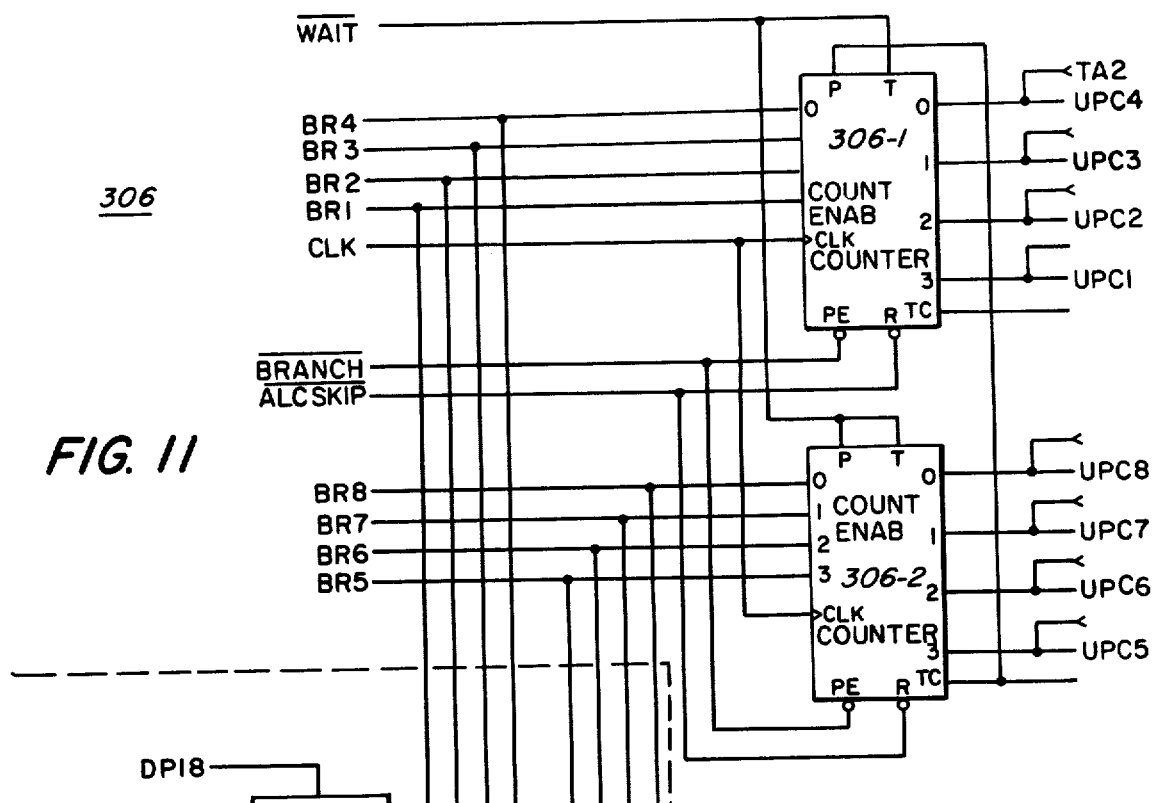
FIG. 11 is a circuit digram of circuitry in the control sequencer 306 shown in FIG. 2.

Referring now to FIG. 11 there is illustrated a circuit diagram of circuitry in the control sequencer 306. The circuitry includes two 4 bit counters 306-1 and 306-2. The counters accept as inputs the outputs of the starting address ROMS 307. The counters are instructed by various control signals to either branch (i.e. load directly from ROMS 307) or to increment their own contents. The counters can also be cleared to zero for certain applications. The signal which tells the counters whether or not to load the contents from ROMS 307 is provided by the test multiplexer 311.

Figure 12:
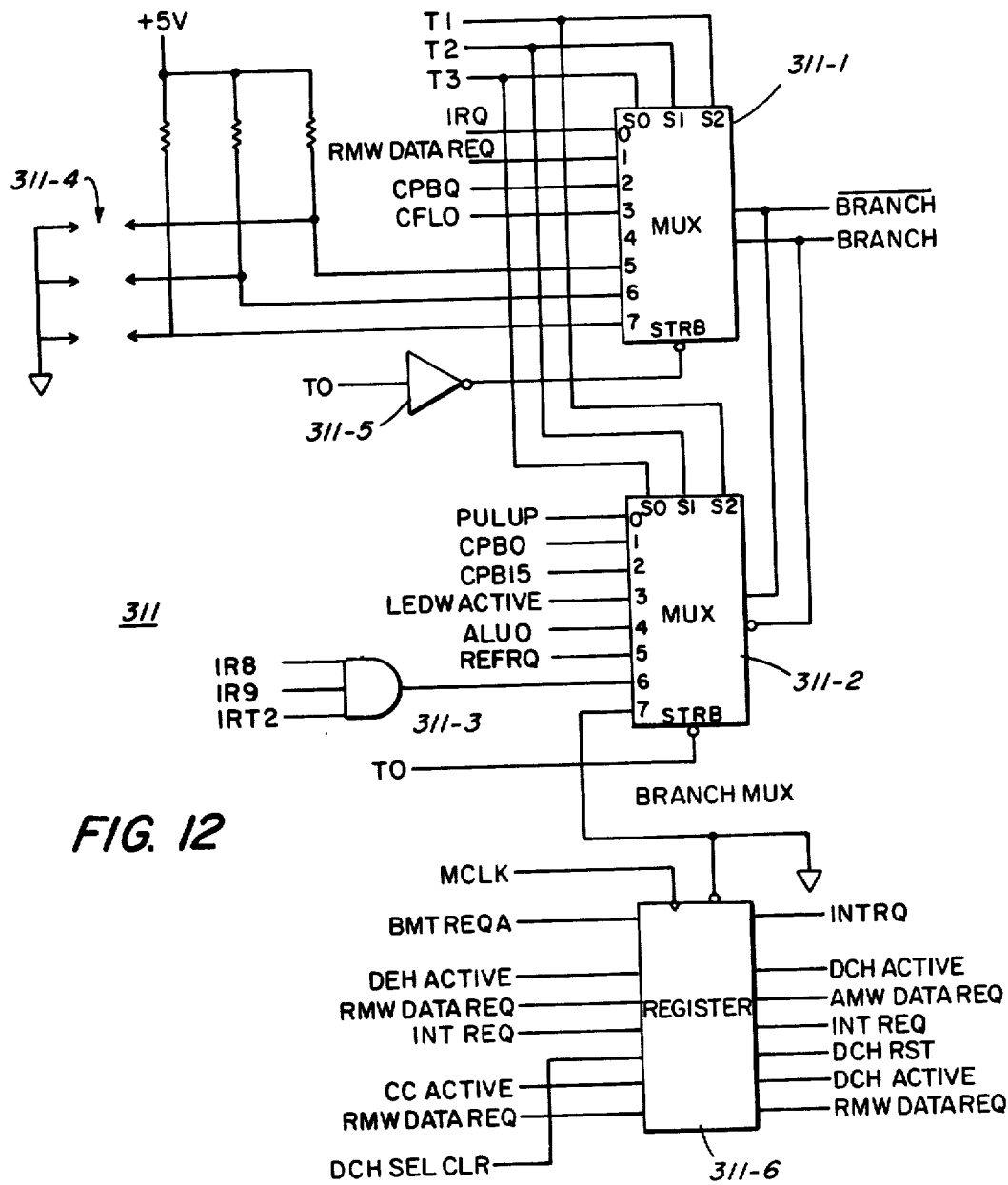
FIG. 12 is a circuit diagram of circuitry in the test multiplexer 311 shown in FIG. 2.

Referring now to FIG. 12, parts (a) and (b), there is illustrated a circuit diagram of circuitry in the test multiplexer 311. Multiplexer 311 comprises two 1 of 8 multiplexers 311-1 and 311-12. These multiplexers accept a variety of conditions to test to determine whether to load or whether to simply increment counters 306-1 and 306-2. The test multiplexer 311 also includes some extraneous logic associated with multiplexers 311-1 and 311-2. This logic includes a gate 311-3 to provide an instant indication of the state of three lines i.e. IR8, IR9 and IR12, relative to each other, a series of jumpers 311-4 which can be used to indicate various items such as whether a certain feature is installed in the host computer, a gate 311-5 which facilitates enabling either multiplexer 311-1 or multiplexer 311-2 to determine a gross decode of the test condition being called for and a register 311-6 which provides synchronization of some of the branch conditions. Essentially, register 311-6 clocks certain inputs that are potentially changing and stabilizes them.

Referring now to FIG. 13 parts (a) and (b), there is illustrated a circuit diagram of circuitry in the ACIA control and select logic unit 202 and the ACIA data latch unit 203. ACIA control and select logic unit 202 comprises a flip-flop 202-1 which is driven by a gate 202-2 and a gate 202-3. Flip flop 202-1 controls the timing for ACIA data latch 203. The ACIA data latch 203 comprises a pair of buffers 203-1 and 203-2. Buffer 203-1 functions as a latch and accepts as inputs MSI8 through MDI15. The inputs received are trapped and are subsequently enabled onto lines ACIA DATA $\phi$ through ACIA DATA 7. ACIA DATA $\phi$ through ACIA DATA 7 is an 8 bit bidirectional bus which communicates with PCI's 201-1 through 201-16. When signalled by the ACIA control and select logic unit 202, buffer 203-1 will trap signals MDI8-15 and enable them onto ACIA DATA $\phi$ through 7 (bus). Buffer 203-2 accepts as inputs a control signal from gate 202-4 which is part of the AICA control and select logic 202. The signal tells buffer 203-2 to drive data from ACIA DATA $\phi$ through 7 directly onto the central processor bus 21. Thus information generated by the control processor 35 can be placed onto ACIA DATA $\phi$-7 and data can be taken from this bus and placed back into central processor 35.

Latch 202-5 stabilizes certain critical address bits. In particular, it traps the state of MADR14 and MADR15, which are obtained from column address register 406 in memory section 41, at critical points and makes them stable for the appropriate length of time.

The ACIA control and select logic unit 202 further includes a pair of flip-flops 202-6 and 202-7, four gates labelled 202-8 through 202-11 and a pair of decoders 202-12 and 202-13. Flip flops 202-6 and 202-7 along with gates 202-8 through 202-11 combine to provide a signal called WAIT which is sent into the control sequencer 306 and tells the control sequencer to "freeze" for one clock period. This is necessary because of the face that the PCI's take longer to access than a typical memory locations. Therefore, when this logic subcircuit detects that a PCI is being accessed it will issue a WAIT signal to "freeze" the control sequencer 306 for the necessary period of time. The added clock time (i.e. around 110 nanoseconds) is sufficient to insure that the PCI's operate properly. Decoders 202-12 and 202-13 accept as inputs MADR 10-13 and perform a gross decoding of the memory address to determine which one of the PCI's should be accessed.

Figure 14:
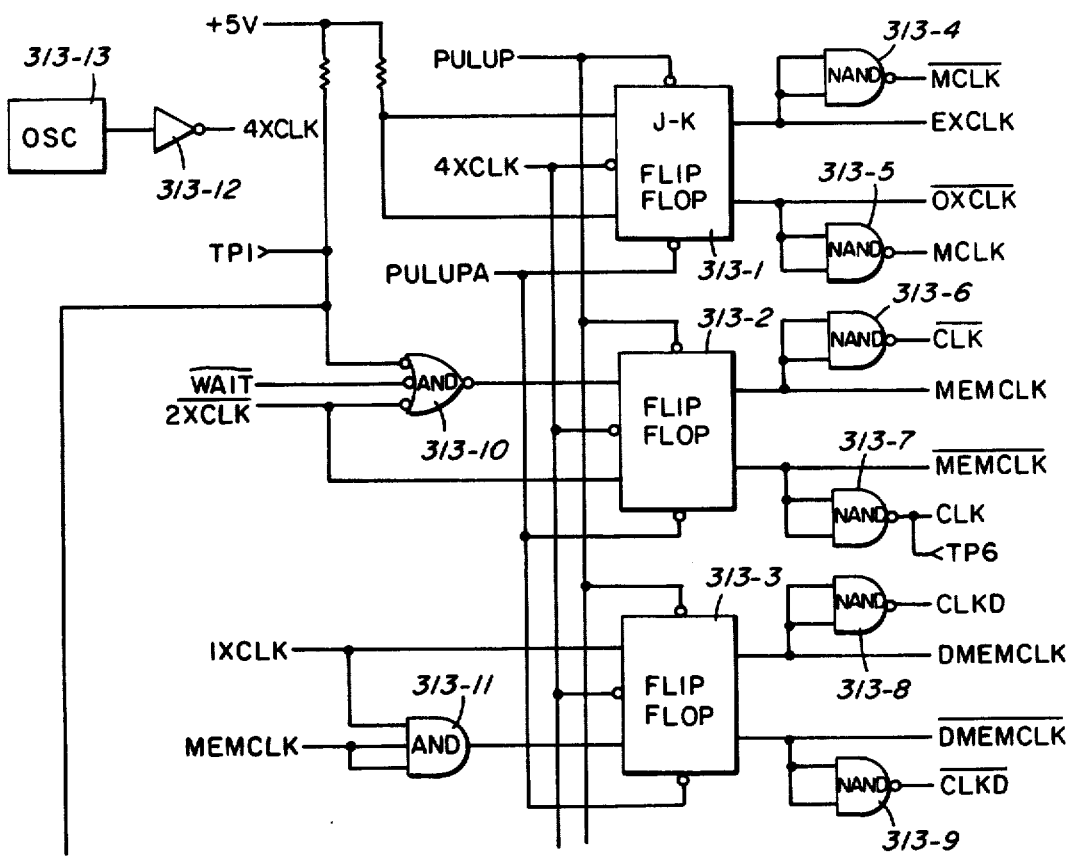
FIG. 14 is a circuit diagram of circuitry in the system timing generator 313 shown in FIG. 2.

Referring now to FIG. 14 parts (a) and (b) there is illustrated a circuit diagram of circuitry in the system timing generator 313. The circuitry includes a number of J-K flip-flops, a plurality of NAND gates 313-4 through 313-9, serving as drivers, a pair of AND gates 313-10 and 313-11; an AND gate 313-12 and a crystal oscillator 313-13. Basically, the flip-flops accept as an input a signal referred to as 4XCLK which is obtained from oscillator 313-13 through driver 313-12. Oscillator 313-13 has a frequency of 17.77 MHZ, which sets the speed at which the IAC operates. The output signal 4XCLK from driver 313-12 is fed into flip-flops 313-1, 313-2 and 313-3. In the flip-flops, the signal is combined with the WAIT signal so that the clocks can be frozen in their proper state. Generally speaking, the system timing generator 313 provides the needed clock signals for the IAC, these clock signals including MCLK which is also known as 2XCLK, the difference being that MCLK is buffered for transmission around the IAC. MCLK and 2XCLK run at one-half the speed of 4XCLK with the flip-flops 313-1 through 313-3 performing a "divide by" function. There is also a signal CLK which is run at one fourth of the 4XCLK and a signal called MEMCLK which is the unbuffered version of CLK. There is a signal CLKD which is a skewed version of CLK. This signal is skewed by 90° and serves to provide an accurate timing edge in the middle of CLK.

Gates 313-10 and 313-11 provides some decoding necessary to achieve the proper phase relationship between CLKD clock and MCLK.

Referring now to FIG. 15 there is illustrated a circuit diagram of circuitry in the instruction register 308. The circuitry includes a 16 bit instruction register in the form of two 8 bit registers 308-1 and 308-2. These registers are loaded at the appropriate time on signals from the control store ROMS 305.

Figure 16:
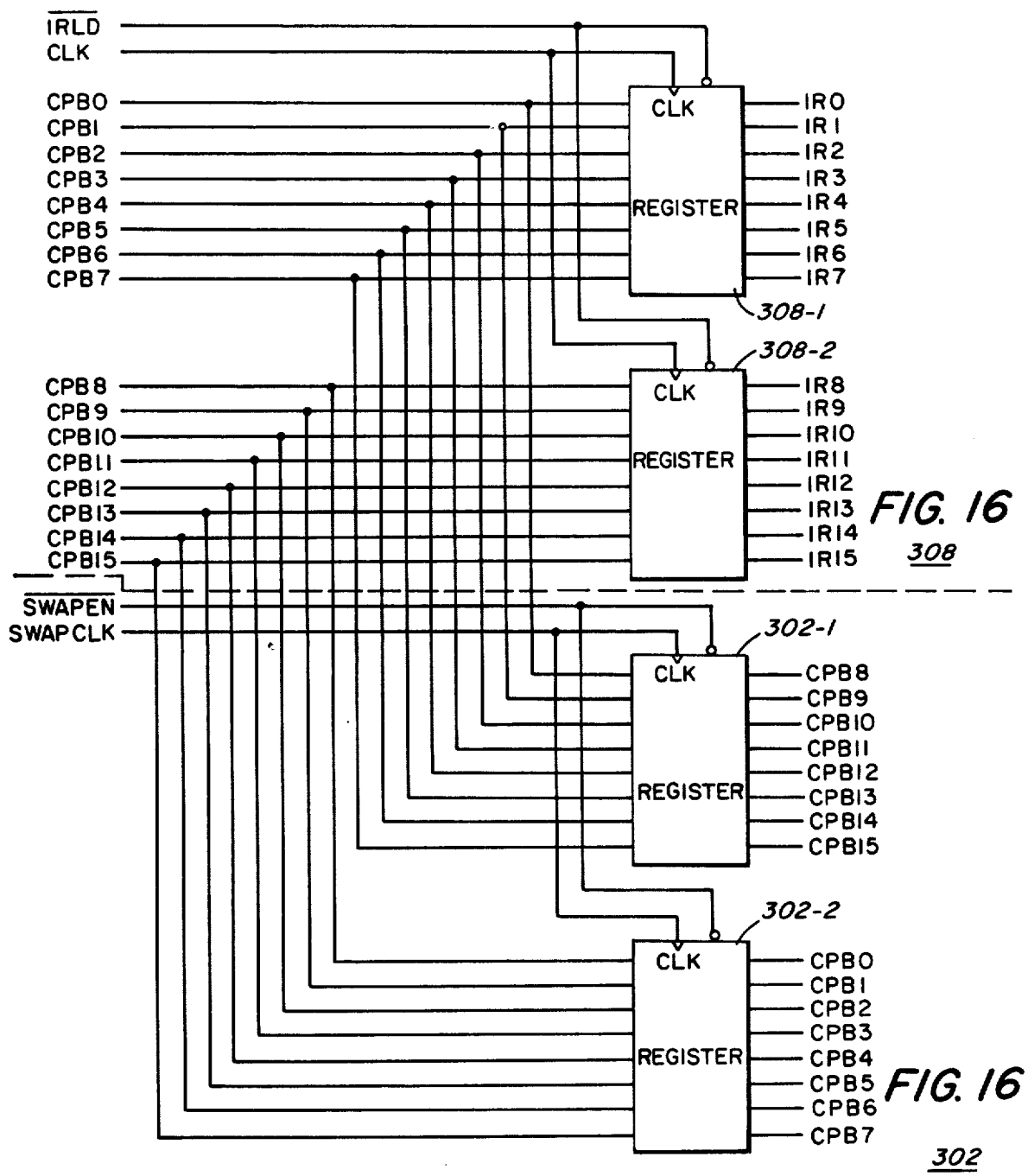
FIG. 16 is a circuit diagram of circuitry in the swap logic unit 302 shown in FIG. 2.
Figure 14A:
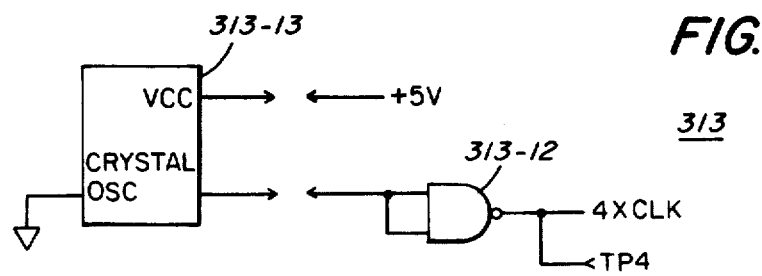

Referring now to FIG. 16 there is illustrated a circuit diagram of circuitry in the swap logic unit 302. The circuitry includes a 16 bit register in the form of two 8 bit registers 302-1 and 302-2 which are clocked at the appropriate time. The swap logic unit 302 is connected at its inputs and its outputs to the central processor bus. If the swap logic unit 302 is clocked at one point in time and then enabled the contents of the two 8 bit registers will be swapped.

Figure 17:
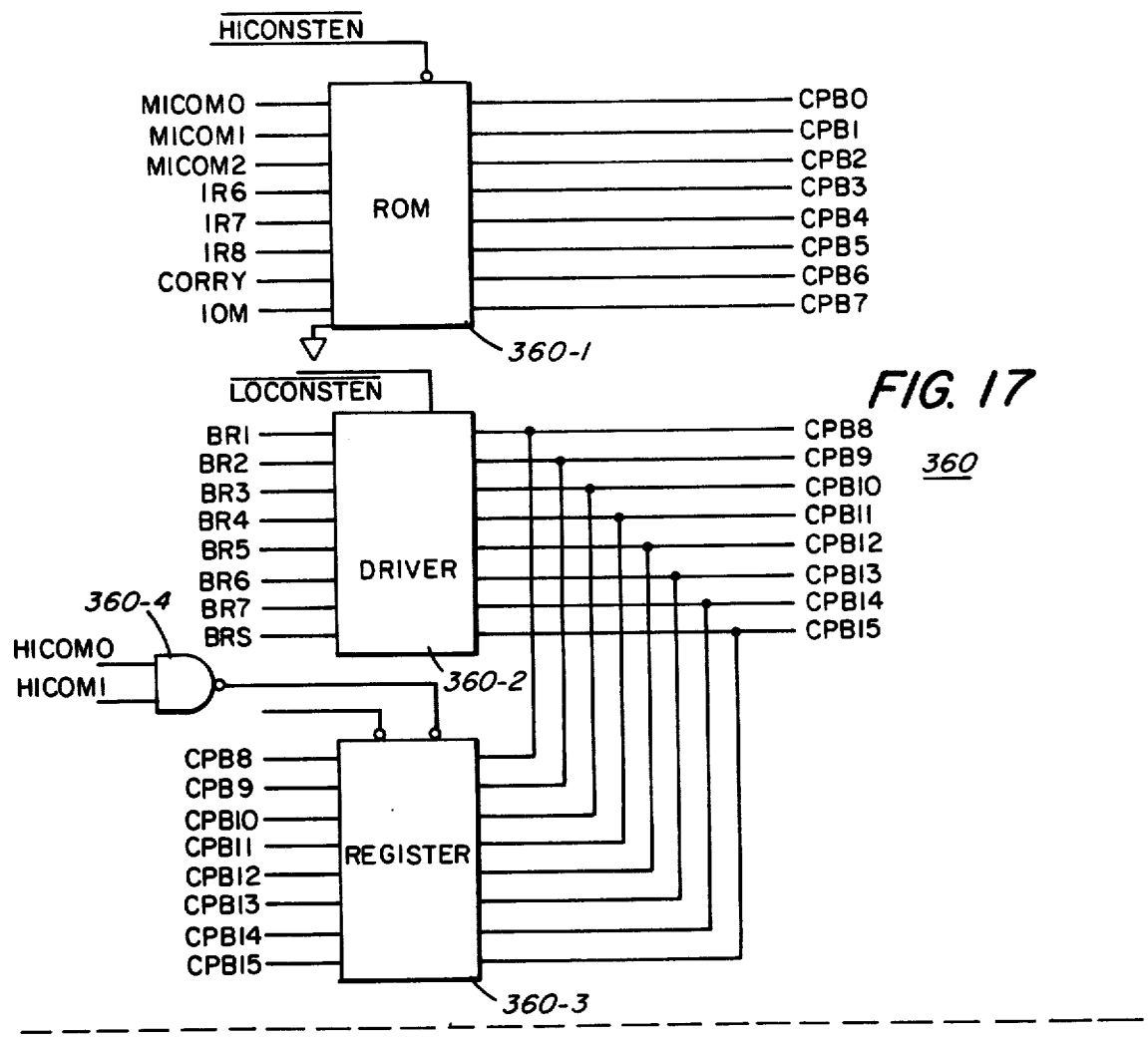
FIG. 17 is a circuit diagram of circuitry in the high constant ROM unit 360 shown in FIG. 2.

Referring now to FIG. 17, there is illustrated a circuit diagram of circuitry in the high constant ROM unit 360. The circuitry includes a ROM 360-1 and an 8 bit driver 360-2. The high constant ROM 360 accepts inputs from the control store ROMS 305, the instruction register 308 and a signal called CARRY from the central processing element 301. The 8 bit driver 360-2 allows the signals on lines BR1 through BR8 to be transferred to the central processor bus lines CPB8 through CPB15. The circuitry further includes a register 360-3 which can trap CPB8 through CPB15 on one cycle and if commanded so by control gate 360-4, hold them until the next cycle.

Figure 18:
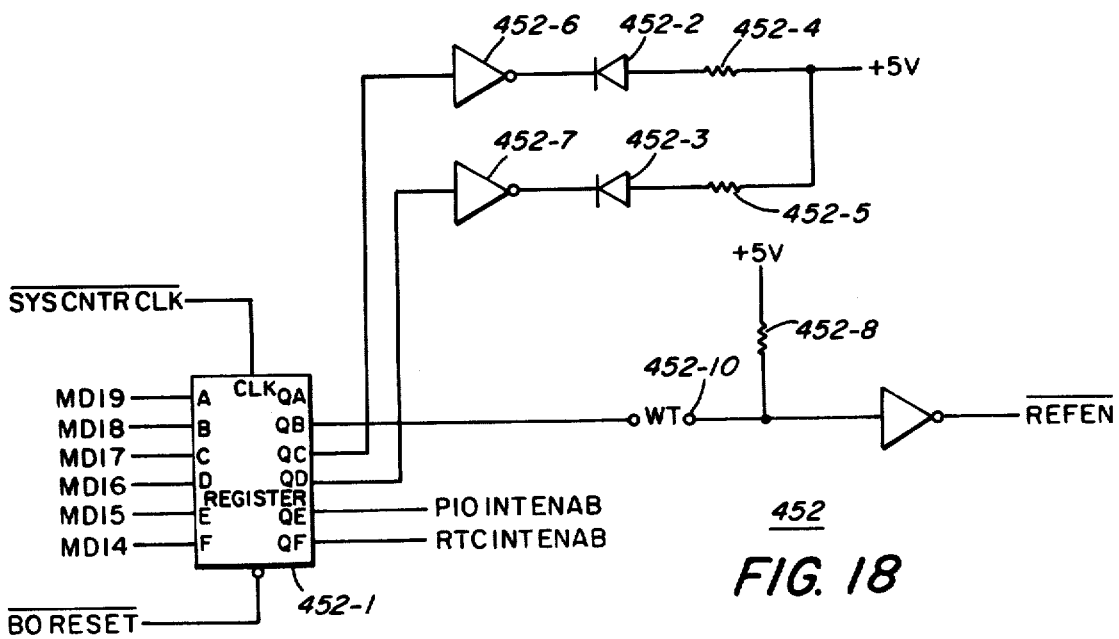
FIG. 18 is a circuit diagram of circuitry in the system control register 452 shown in FIG. 2.

Referring now to FIG. 18, there is illustrated a circuit diagram of circuitry in the system control register 452. The circuitry includes a 6 bit register 452-1, a pair of light emitting diodes 452-2 and 452-3 having associated current limiting resistors 452-4 and 452-5, respectively, a pair of open collector drivers 452-6 and 452-7 respectively, a pull-up resistor 452-8, an inverter 452-9 and a jumper 452-10. When the jumper 452-10 is inserted, then, by loading an appropriate bit into register 452-1 the signal $\overline{REFEN}$ may be made non assertive. When this happens, the refresh timer will in effect be disabled so that the refresh signal is not called for.

Figure 19:
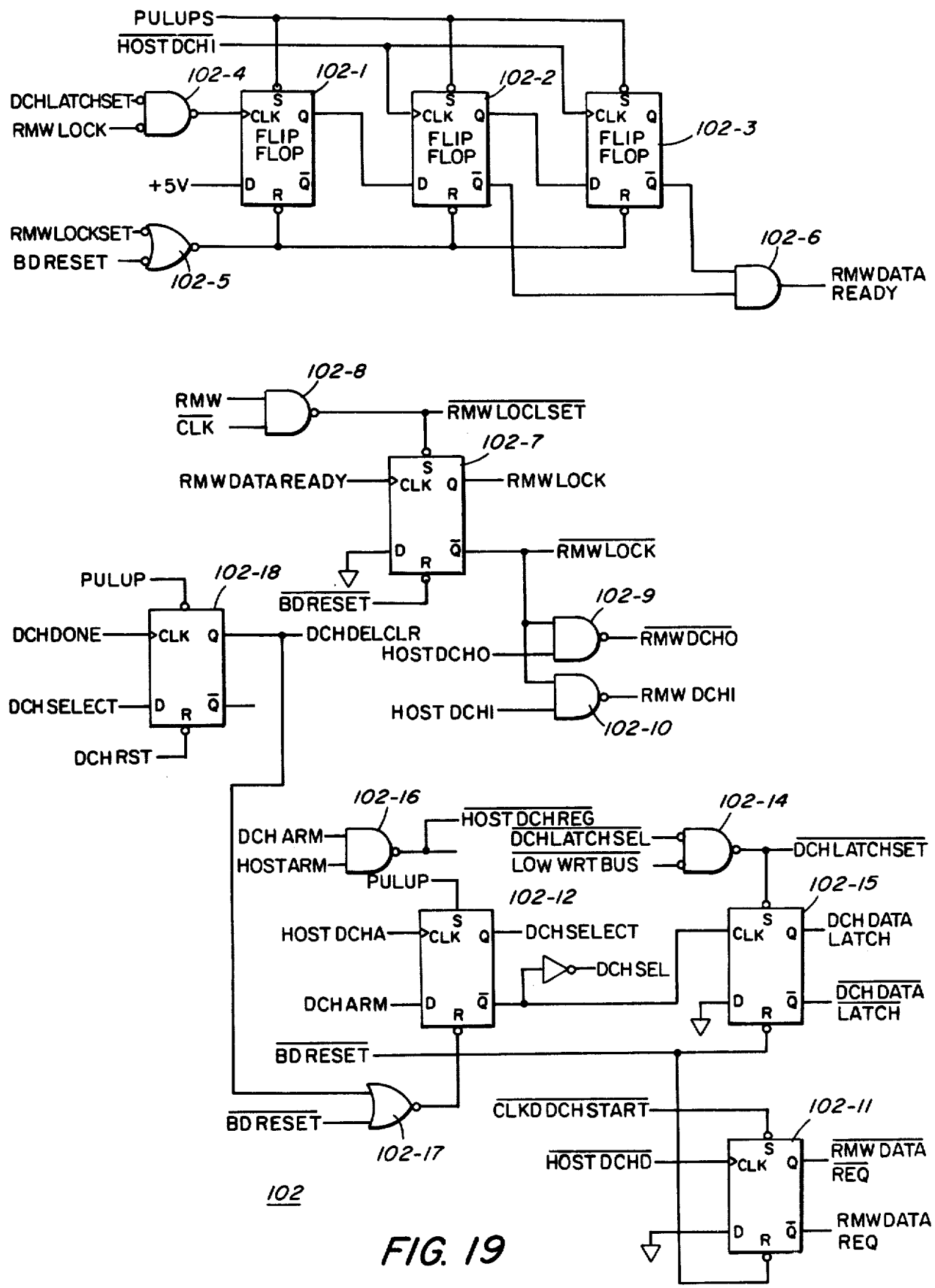
FIG. 19 is a circuit diagram of circuitry in the data channel control unit 102 shown in FIG. 2.

Referring now to FIG. 19, there is illustrated a circuit diagram of circuitry in the data channel control unit 102. The circuitry shown is used to control a feature of the host I/O bus referred to as an "indivisible read modified write". What the circuit does is provide via a pridefined protocol signals to the host CPU that the IAC is going to perform two consecutive operations on the host I/O bus 13 into a memory in the host CPU and that the host CPU is not to allow any other memory accesses between these two accessed. The circuitry includes three flip-flops labelled 102-1, 102-2 and 102-3, an OR gate 102-4, an AND gate 102-5, an AND gate 102-6 which collectively function as an RMW sequencer and produce a signal called RMW DATA READY. This signal signifies to the host CPU that there is data to be fetched. The circuitry further includes a flip-flop 102-7 which is set by a NAND gate 102-8 when the special sequence is requested and is in effect the starting point for the RMW sequencer. Flip-flop 102-7 is also used to drive gates 102-9 and 102-10 which are used simply to mask off certain signals during the sequencing operation.

The circuitry further includes a flip-flop 102-11 which is first clocked by the host CPU to notify the flip-flop 102-11 that the data being read is here. The remaining logic is used to control the transfer itself of the data from the host I/O bus 13 into the IAC and then back again into the host I/O bus for transfer to the memory in the host CPU. The logic includes a flip-flop 102-12 which detects if the memory operation requested in the host CPU is in progress. An inverter 102-13 to buffer the signal output of flip-flop 102-12 and an OR gate 102-14 which sets a flip-flop 102-15 to allow the data to pass into the data channel data latch 103. In addition, there is a NAND gate 102-16 which provides a gated signal denoting that the acknowledge signal from the host CPU is for this particular IAC, a NOR gate 102-17 which resets the select on flip-flop 102-12. The gate 102-17 is on occassion driven by flip-flop 102-18 which provides the reset signal to the gate 102-17.

Referring now to FIG. 20, there is illustrated a circuit diagram of circuitry in the row address register 405, the column address register 406, the multiplexer section 407 and the drivers 408.

Row address register 405 is an 8 bit latch and column address register 406 is an 8 bit latch. Multiplexer section 407 comprises a pair of multiplexers 407-1 and 407-2. Drivers 408 comprise a set of seven open collector high powered NAND gates 408-1 through 408-7, which are being used as drivers, and an associated series connected resistors 408-8 through 408-14 to control reflections.

Figure 21:
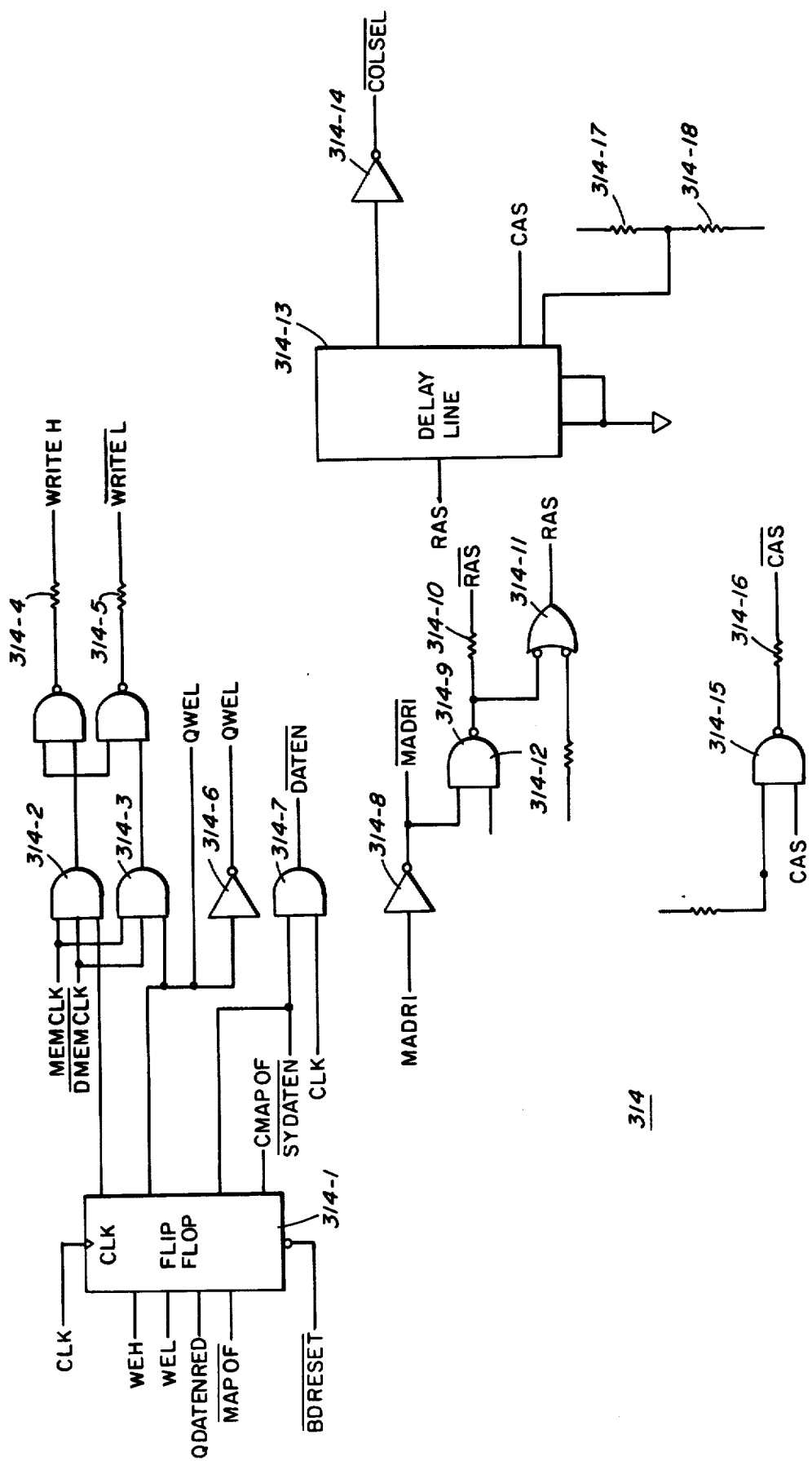
FIG. 21 is a circuit diagram of circuitry in the memory control unit 314 as shown in FIG. 2.

Referring now to FIG. 21 there is illustrated a circuit diagram of circuitry in the memory control unit 314. The circuitry includes a register 314-14 which performs some of the synchronizing of certain signals such as the write signals and the DATEN signals and a pair of 3 input AND gates 314-2 and 314-3 which create a pair of signals which after being gated with the most significant bit of address MADR1 will determine if the WRITE H and WRITE L signals are to be applied to the memory. The gating is performed through a pair of NAND gates 314-4 and 314-5. There is also an inverter 314-6 which provides an inversion of signal OWEL from flip-flop 314-1 and a gate 314-7 which provides the signal DATEN which is referred to, especially during the READ operation. Also included is an inverter 314-8 to provide an inversion of MADR1, a gate 314-9 which is used to create the signal $\overline{RAS}$ and which has a limiting resistor 314-10 in series with it, a gate 314-11 and a pull up resistor 314-12 at one of the inputs to provide the inversion of $\overline{RAS}$. The buffered version of the RAS signal is fed into a delay line 314-13 from which is derived the signal $\overline{COL\ SEL}$ through an inverter 314-14 and a signal CAS. The signal CAS is passed through a gate 314-15 and emerges through a series limiting resistor 314-16 and appear as signal $\overline{CAS}$. Also coupled to delay line 314-13 are a pair of terminating resistors 314-17 and 314-18.

Referring now to FIG. 22, there is illustrated a circuit diagram of the split baud selection unit 203.

The circuitry includes a pair of 4 bit registers 203-1 and 203-2, a 6 bit register 203-3 which obtain information from the central processor bus 21 as to which of the 8 channels should receive an independently generated receive clock. The information obtained is used to gate the clock source through a set of eight-tri-state gates 2-3-4 through 203-11, one connected to each applicable PCI. Also included is a NAND gate 203-12 which controls when the clock is applied to the bank of registers 203-1 through 203-3. Finally, the circuitry includes a BAUD rate generator 203-13, a set of pull-up resistors 203-12 and an inverter 203-14 (to provide buffering).

Figures 23, 24:
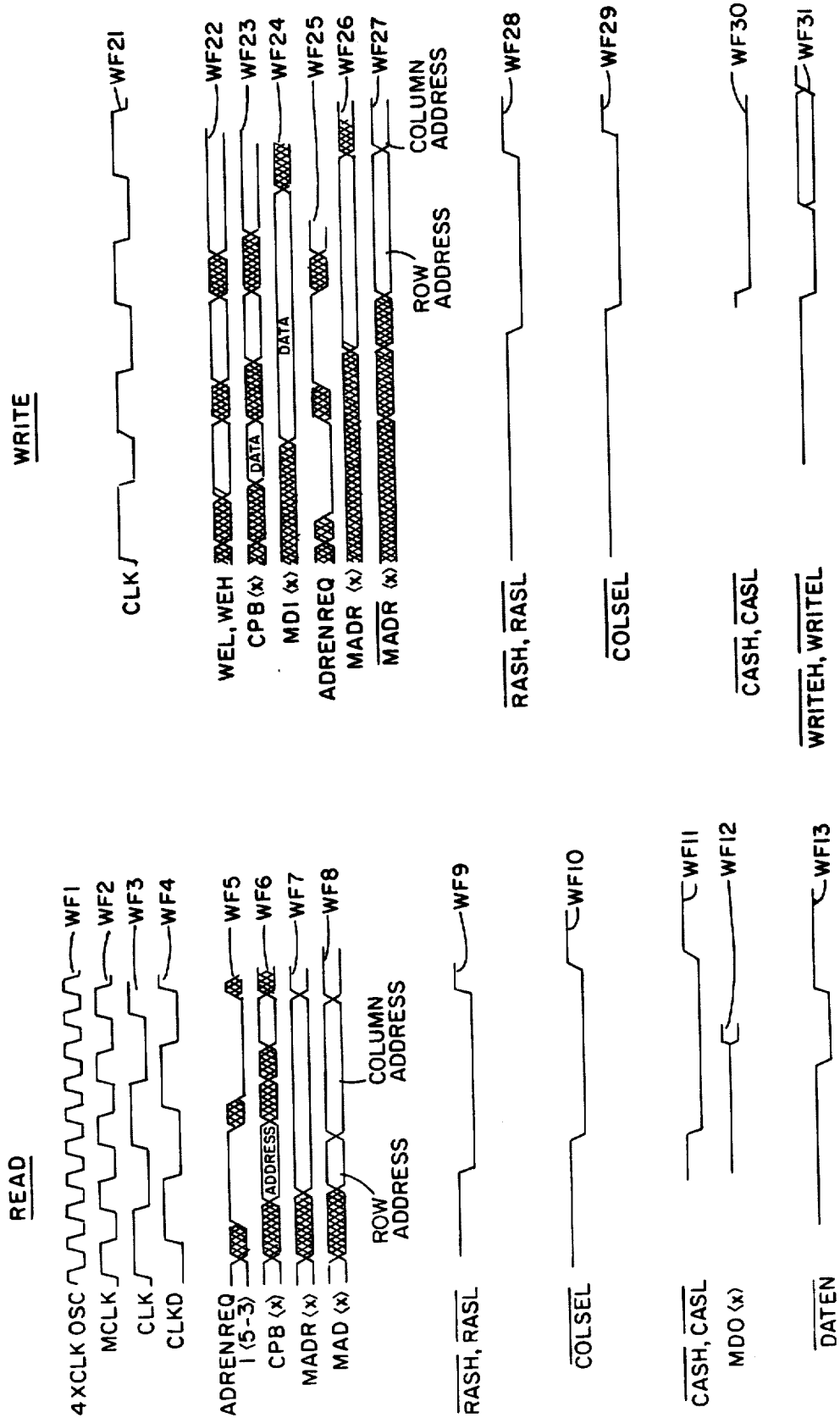
FIG. 23 is a timing diagram showing a number of the signals generated during a READ operation.
FIG. 24 is a timing diagram showing a number of signals generated during a WRITE operation.

Referring now to FIG. 23, there is illustrated a timing diagram of a number of signals generated during a READ operation.

Waveform WF1 illustrates the signal OSC. Waveform WF2 illustrates the signal MCLK. Waveform WF3 illustrates the signal CKL. Waveform WF4 illustrates the signal CLKD. Waveform WF5 illustrates the signal ADRENREQ I<5-3>. Waveform WF6 illustrates the signal CPB<$\lambda$>. Waveform WF7 illustrates the signal MAD<x>. Waveform WF8 illustrates the signal $\overline{MAD<x>}$. Waveform WF9 illustrates the signal $\overline{RASH}$, $\overline{RASL}$. Waveform WF10 illustrates the signal $\overline{COLSEL}$. Waveform WF11 illustrates the signal $\overline{CASH}$, $\overline{CAHL}$. Waveform WF12 illustrates the signal MDO<x>. Waveform WF13 illustrates the signal DATEN.

Waveform OSC illustrates the output signal from the main oscillator clock from system timing generator 313. Waveform MCLK, CLK and CLKD illustrate some of the other output signals from system timing generator 313, MCLK being a signal running at one-half the speed of 4XCLK, CLK being a signal running at one-half the speed of MCLK and CLKD being simply a clock at the same frequency as CLK but skewed by 90°. Clock CLK is the most critical clock, it being the clock on which most of the other signals are based. The rising edge of clock CLK is the start of a microcycle which is part of a memory cycle. Signal CLK defines the motorcycle.

When the IAC processor (sections 31 and 33) wishes to read a location from memory unit 401 the following sequence of events occurs. A short time after CLK rises, then ADRENREQ is asserted (goes high) initiating the read cycle in the memory, the cross hatched portion of the waveform meaning that its condition is unkown or not of interest. Shortly after the assertion of ADRENREQ, the central processor bus 21 will have an address presented on it by the processor. This address is passed through and is trapped by the row and column registers 405 and 406 and appears as MADR1 through 15. This is shown on the waveforms as MADR<x>. The signal is then ready to be placed into multiplexer 407. Since it is trapped, it will persist for a period of time on the order of a couple of microcycles. The lower half of the address is then selected by multiplexer 407 put through drivers and appear as MAD $\phi$-6. This is illustrated as MAD<x>.

Signals $\overline{RASH}$ and $\overline{RASL}$ are row address high and row address low signals respectively, the term "high" meaning the upper portion of the 16 bit word and the term "low" meaning the lower portion of the 16 bit word. Both signals are present because of loading considerations. The assertion of these signals guarantees to the memory 401 that the address is present. The signal is termed such that the MAD logic has the row address and it is guaranteed to be stable. At that time the RAS signal will assert and that a memory cycle is starting and that the row address is valid.

Some predefined time after RAS has been asserted, $\overline{COLSEL}$ will be asserted to place the column address MAD<$\lambda$> where upon the $\overline{CASH}$ and $\overline{CASL}$ signals will be asserted. These signals tell memory 401 that the column address is stable on the MAD lines.

At this point the read has been initiated and the IAC knows it has been selected to do a READ operation. At some point later the memory 401 will place the requested data on the MS0 lines which will go through the bus drivers 409. AT approximately this same time, the processor will know that data should be present and will assert the signal DATEN enabling the bus drivers 409 to place the information onto the central processor bus 21 for reading by the processor.

Referring now to FIG. 24, there is illustrated a timing diagram of a number of signals generated during a WRITE operation.

Waveform WF21 illustrates the signal CLK. Waveform WF22 illustrates the signal $\overline{WEL}$, $\overline{WEH}$. Waveform WF23 illustrates the signal CPB<x>. Waveform WF24 illustrates the signal $\overline{MDI<x>}$. Waveform WF25 illustrates the signal ADRENREQ. Waveform WF26 illustrates the signal $\overline{MADR<\lambda>}$. Waveform WF27 illustrates the signal MAD<x>. Waveform WF28 illustrates the signal $\overline{RASH}$, $\overline{RASL}$. Waveform WF29 illustrates the signal $\overline{COLSEL}$. Waveform WF30 illustrates the signal $\overline{CASH}$, $\overline{CASL}$. Waveform WF31 illustrates the signal $\overline{WRITTEH}$, $\overline{WRITEL}$.

In a WRITE operation, the timing signals employed are somewhat different from a READ operation. Signals $\overline{WEH}$ and $\overline{WEL}$ are the write enable signals for the local memory 401, informing the memory whether a read or a write operation is in progress. They are obtained from the processor and are asserted a short time after the raising edge of CLK indicating that a write operation is being requested. A short time thereafter, the processor will place onto central processor bus 21 the data to be written. This is indicated by signal CPB<x>. Following this, the MDI lines out of write data register 404, and at the appropriate time, will trap the data present on the central processor bus 21 so that the data can be accepted by local memory 401 for writing.

At this point, the MSI lines have data. At that time the processor will then go through an operation to put the address out on the next cycle. Similarly, as in the READ operation, the $\overline{RASH}$ and $\overline{RASL}$ signals will be asserted, the column select signals will be asserted at the appropriate time, the $\overline{CASH}$ and $\overline{CASL}$ signals will be asserted at the proper time. Then, since the WRITE H and WRITE L signals are asserted, the write operation will occur using that data.

In the following Appendix A there is listed the instruction set for operating the IAC along with a brief description of each one of the instructions.

IAC Instruction Set    APPENDIX A

```
                                                              1 1 1 1 1 1
                                          0 1 2 3 4 5 6 7 8 9 0 1 2 3 4 5
                                          ---------------------------------
ADC     Add Complement                    1 acs acd 1 0 0 shf cry # skip_
ADD     Add                               1 acs acd 1 1 0 shf cry # skip_
AND     And                               1 acs acd 1 1 1 shf cry # skip_
COM     Complement                        1 acs acd 0 0 0 shf cry # skip_
INC     Increment                         1 acs acd 0 1 1 shf cry # skip_
MOV     Move                              1 acs acd 0 1 0 shf cry # skip_
NEG     Negate                            1 acs acd 0 0 1 shf cry # skip_
SUB     Subtract                          1 acs acd 1 0 1 shf cry # skip_
DSZ     Decrement and Skip if Zero        0 0 0 1 1 @ ind __displacement_
EDSZ    Extended Decrement and Skip if Zero 1 0 0 1 1 1 ind 0 0 1 1 1 0 0 0
ISZ     Increment and Skip if Zero        0 0 0 1 0 @ ind __displacement_
EISZ    Extended Increment and Skip if Zero 1 0 0 1 0 1 ind 0 0 1 1 1 0 0 0
LDA     Load Accumulator                  0 0 1 acd @ ind __displacement_
ELDA    Extended Load Accumulator         1 0 1 acd 1 ind 0 0 1 1 1 0 0 0
STA     Store Accumulator                 0 1 0 acd @ ind __displacement_
ESTA    Extended Store Accumulator        1 1 0 acd 1 ind 0 0 1 1 1 0 0 0
STB     Store Byte                        1 acs acd 1 1 0 0 0 0 0 1 0 0 0
ESTB    Extended Store Byte               1 0 1 acd 1 ind 0 1 1 1 1 0 0 0
LDB     Load Byte                         1 acs acd 1 0 1 1 1 0 0 1 0 0 0
ELDB    Extended Load Byte                1 0 0 acd 1 ind 0 1 1 1 1 0 0 0
CMV     Character Move                    1 1 0 1 0 1 1 1 0 1 0 1 0 0 0
ADDI    Add Immediate                     1 1 1 acd 1 1 1 1 1 1 1 1 0 0 0
ANDI    And Immediate                     1 1 0 acd 1 1 1 1 1 1 1 1 0 0 0
LEF     Load Effective Address            0 1 1 acd @ ind __displacement_
ELEF    Extended Load Effective Address   1 1 1 acd 1 ind 0 0 1 1 1 0 0 0
IOR     Inclusive Or                      1 acs acd 0 0 1 0 0 0 0 1 0 0 0
IORI    Inclusive Or Immediate            1 0 0 acd 1 1 1 1 1 1 1 1 0 0 0
LSH     Logical Shift                     1 acs acd 0 1 0 1 0 0 0 1 0 0 0
XOR     Exclusive Or                      1 acs acd 0 0 1 0 1 0 0 1 0 0 0
CLMI    Compare to Limits Immediate       1 0 0 acd 0 0 1 1 1 1 0 1 0 0 0
CLMP    Compare to Limits Remote          1 acs acd 0 1 0 0 0 1 0 1 0 0 0
JMP     Jump                              0 0 0 0 0 0 @ ind __displacement_
EJMP    Extended Jump                     1 0 0 0 0 1 1 ind 0 0 1 1 1 0 0 0
JSR     Jump to Subroutine                0 0 0 0 1 0 ind __displacement_
EJSR    Extended Jump to Subroutine       1 0 0 0 1 1 ind 0 0 1 1 1 0 0 0
POPI    Pop Single Accumulator            1 0 0 acd 0 1 1 1 0 1 0 1 0 0 0
POPJ    Pop PC and Jump                   1 0 0 1 1 1 1 1 1 0 0 1 0 0 0
PSHI    Push Single Accumulator           1 0 0 acd 0 0 1 0 1 1 0 1 0 0 0
RTN     Return                            1 0 1 0 1 1 1 1 1 0 0 1 0 0 0
SAVE    Save                              1 1 1 0 0 1 1 1 1 1 0 1 0 0 0
BTO     Set Bit to One                    1 acs acd 1 0 0 0 0 0 1 0 0 1 0 0
BTZ     Set Bit to Zero                   1 acs acd 1 0 0 0 1 0 0 1 0 0 0
SZB     Skip on Zero Bit                  1 acs acd 1 0 0 1 0 0 0 1 0 0 0
SZBO    Skip on Zero Bit and Set Bit to One 1 acs acd 1 0 0 1 1 0 0 1 0 0 0
SNB     Skip on Non-zero Bit              1 acs acd 1 0 1 1 1 1 1 1 0 0 0
LRB     Locate and Reset Lead Bit         1 acs acd 1 0 1 0 0 0 1 0 0 0 0
HMSTA   Host Map Store Accumulator        1 0 1 acd 0 ind 1 1 0 1 1 0 0 0
HSTA    Host Store Accumulator            1 1 0 acd 0 ind 1 1 0 1 1 0 0 0
HLDA    Host Load Accumulator             1 0 0 acd 0 ind 1 1 0 1 1 0 0 0
HLDB    Host Load Byte                    1 acs acd 0 0 0 1 0 0 1 1 0 0 0
HSTB    Host Store Byte                   1 acs acd 0 0 0 0 1 1 0 1 0 0 0
HBTO    Host Set Bit to One               1 acs acd 1 1 0 1 1 1 0 1 0 0 0
HBTZ    Host Set Bit to Zero              1 acs acd 0 0 0 0 1 0 1 0 0 0 0
HSZBO   Host Skip on Zero Bit and Set Bit
        to One                            1 acs acd 1 0 1 1 0 0 1 1 0 0 0
HSZB    Host Skip on Zero Bit             1 acs acd 0 1 0 0 1 1 0 1 0 0 0
HSNB    Host Skip on Non-zero Bit         1 acs acd 0 1 1 0 1 1 0 1 0 0 0
HINS    Host Increment and Skip if Zero   1 0 0 acd 0 0 0 1 0 1 0 1 0 0 0
HDES    Host Decrement and Skip if Zero   1 0 0 acd 0 0 1 0 1 1 0 1 0 0 0
INTON   Interrupts On                     1 0 0 0 0 0 1 0 1 1 1 0 1 0 0 0
INTOF   Interrupts Off                    1 0 0 0 0 0 1 0 1 0 1 0 1 0 0 0
BRKPT   Breakpoint                        1 0 0 0 0 0 1 1 0 1 0 1 0 0 0
SKION   Skip if Interrupts On             1 0 0 0 0 0 1 1 1 1 0 1 1 0 0 0
``` acs denotes source accumulator
    0 0 = ac0
    0 1 = ac1
    1 0 = ac2
    1 1 = ac3 acd denotes destination accumulator
    0 0 = ac0
    0 1 = ac1
    1 0 = ac2
    1 1 = ac3 a denotes memory indirection
    0 = use this address as is
    1 = use this address to find the address to use ind denotes indexing requirements
    0 0 = absolute
    0 1 = relative to program counter
    1 0 = relative to ac2
    1 1 = relative to ac3

_displacement_ denotes an eight-bit displacement shf denotes shift specification
    0 0 = do not shift
    0 1 = rotate left the 17-bit combination of carry and ALC operation result
    1 0 = rotate right the 17-bit combination of carry and ALC operation result
    1 1 = swap the two 8-bit halves of the ALC operation result without affecting carry cry denotes the operation to be performed on the carry bit before initiation of the ALC instruction
    0 0 = leave carry unchanged
    0 1 = initialize carry to 0
    1 0 = initialize carry to 1
    1 1 = complement carry \# notes whether or not to place the result of the ALC operation in the destination accumulator
    0 = load the result into the destination accumulator
    1 = do not load the result into the destination accumulator skip_ denotes the conditions under which the next sequential instruction should be skipped
    0 0 0 = no skip (never skip)
    0 0 1 = skip unconditionally (always skip)
    0 1 0 = skip if carry is zero after performing the operation
    0 1 1 = skip if carry is non-zero after performing the operation
    1 0 0 = skip if result is zero
    1 0 1 = skip if result is non-zero
    1 1 0 = skip if either result is zero or if carry is zero after performing the operation Description of Instructions
---------------------------

ADC - Add Complement - This instruction means initialize the carry as specified by cry, add the complement of acs to acd, shift the result as specified by shf, load or don't load the result into acd as specified by #, and skip or don't skip the next sequential word as specified by skip_.

ADD - Add - This instruction means initialize the carry as specified by cry, add acs to acd, shift the result as specified by shf, load or don't load the result into acd as specified by #, and skip or don't skip the next sequential word as specified by skip_.

AND - And - This instruction means initialize the carry as specified by cry, "and" acs with acd, shift the result as specified by shf, load or don't load the result into acd as specified by #, and skip or don't skip the next sequential word as specified by skip_.

COM - Complement - This instruction means initialize the carry as specified by cry, complement acs, shift the result as specified by shf, load or don't load the result into acd as specified by #, and skip or don't skip the next sequential word as specified by skip_.

INC - Increment - This instruction means initialize the carry as specified by cry, increment acs, shift the result as specified by shf, load or don't load the result into acd as specified by #, and skip or don't skip the next sequential word as specified by skip_.

MOV - Move - This instruction means initialize the carry as specified by cry, shift acs as specified by shf, load or don't load the result into acd as specified by #, and skip or don't skip the next sequential word as specified by skip_.

NEG - Negate - This instruction means initialize the carry as specified by cry, take the 2's complement of acs, shift the result as specified by shf, load or don't load the result into acd as specified by #, and skip or don't skip the next sequential word as specified by skip_.

SUB - Subtract - This instruction means initialize the carry as specified by cry, subtract acs from acd, shift the result as specified by shf, load or don't load the result into acd as specified by #, and skip or don't skip the next sequential word as specified by skip_.

DSZ - Decrement and Skip if Zero - This instruction means decrement the referenced memory location (whose address is computed from the w, displacement and ind fields) and skip the next sequential instruction if the result is zero.

EDSZ - Extended Decrement and Skip if Zero - This instruction means decrement the referenced memory location (whose address is computed from the w and displacement fields in the next word as well as the ind field) and skip the next sequential instruction if the result is zero.

ISZ - Increment and Skip if Zero - This instruction means increment the referenced memory location (whose address is computed from the w, displacement and ind fields) and skip the next sequential instruction if the result is zero.

EISZ - Extended Increment and Skip if Zero - This instruction means increment the referenced memory location (whose address is computed from the w and displacement fields in the next word as well as the ind field) and skip the next sequential instruction if the result is zero.

LDA - Load Accumulator - This instruction means load the acd with the referenced memory location (whose address is computed from the w, displacement and ind fields).

ELDA - Extended Load Accumulator - This instruction means load the acd with the referenced memory location (whose address is computed from the w and displacement fields in the next word as well as the ind field).

STA - Store Accumulator - This instruction means store the acd at the referenced memory location (whose address is computed from the w, displacement and ind fields).

ESTA - Extended Store Accumulator - This instruction means store the acd at the referenced memory location (whose address is computed from the w and displacement fields in the next word as well as the ind field).

STB - Store Byte - This instruction means store the least significant byte of acd into the referenced memory byte location (whose address is contained in acd).

ESTB - Extended Store Byte - This instruction means store the least significant byte of acd into the referenced memory byte location (whose address is computed from the displacement in the next word and the ind field).

LDB - Load Byte - This instruction means load the least significant byte of acd with the referenced memory byte location (whose address is contained in acd).

ELDB - Extended Load Byte - This instruction means load the least significant byte of acd with the referenced memory byte location (whose address is computed from the displacement in the next word and the ind field).

CMV - Character Move - This instruction means move a string of characters from one place in memory to another, said movement being completely specified by the contents of ac<0-3>.

ADDI - Add Immediate - This instruction means add the number contained in the next word to acd.

ANDI - And Immediate - This instruction means "and" the number contained in the next word with acd.

LEF - Load Effective Address - This instruction means load the acd with the address of the referenced memory location (computed from the displacement, w and ind fields).

ELEF - Extended Load Effective Address - This instruction means load the acd with the address of the referenced memory location (computed from displacement in the next word and the ind field).

IOR - Inclusive Or - This instruction means inclusive "or" acs with acd and place the result in acd.

IORI - Inclusive Or Immediate - This instruction means inclusive "or" acd with the number contained in the next word, placing the result in acd.

LSH - Logical Shift - This instruction means shift acd as specified by the contents of acs.

XOR - Exclusive Or - This instruction means exclusive "or" acs with acd and place the result in acd.

CLMI - Compare to Limits Immediate - This instruction means compare acs with the numbers contained in the next two words and skip/don't skip the next sequential instruction based on the results of this comparison.

CLMM - Compare to Limits Memory - This instruction means compare acs with numbers pointed to by acd and skip/don't skip the next sequential instruction based on the results of this comparison.

JMP - Jump - This instruction means branch to the referenced memory location (computed from the #, ind, and displacement fields).

EJMP - Extended Jump - This instruction means branch to the referenced memory location (computed from the # and displacement fields in the next word, and the ind field).

JSR - Jump to Subroutine - This instruction means save the current program counter and branch to the referenced memory location (computed from the #, ind, and displacement fields).

EJSR - Extended Jump to Subroutine - This instruction means save the current program counter and branch to the referenced memory location (computed from the # and displacement fields in the next word, and the ind field).

POPI - Pop Single Accumulator - This instruction means load the acd from the top of the stack.

POPJ - Pop PC and Jump - This instruction means branch to location whose address is at the top of the stack.

PS - Push Single Accumulator - This instruction means place the acd on the top of the stack.

RTN - Return - This instruction means load the accumulators, the carry bit, and the program counter from the stack.

SAVE - Save - This instruction means place the accumulators, the carry bit, and the program counter on the stack.

STO - Set Bit to One - This instruction means set the referenced bit to a one (the bit is specified by the contents of acs and acd).

BTZ - Set Bit to Zero - This instruction means set the referenced bit to a zero (the bit is specified by the contents of acs and acd).

SZB - Skip on Zero Bit - This instruction means skip the next sequential instruction if the referenced bit is a zero (the bit is specified by the contents of acs and acd).

SZBO - Skip on Zero Bit and Set Bit to One - This instruction means skip the next sequential instruction if the referenced bit is a zero and set the bit to a one (the bit is specified by the contents of acs and acd).

SNB - Skip on Non-zero Bit - This instruction means skip the next sequential instruction if the referenced bit is a one (the bit is specified by the content of acs and acd).

LRB - Locate and Reset Lead Bit - This instruction means determine the location of the most significant "1" in acs, add the bit position of this "1" to the contents of acd and reset this "1" to a "0".

HMSTA - Host Map Store Accumulator - This instruction means store the acd at the referenced special location in host memory.

HSTA - Host Store Accumulator - This instruction means store the acd at the referenced location in host memory.

HLDA - Host Load Accumulator - This instruction means load the acd from the referenced location in host memory.

HLDB - Host Load Byte - This instruction means load the acd with the referenced byte in host memory.

HSTB - Host Store Byte - This instruction means store the acd at the referenced byte in host memory.

HBSO - Host Set Bit to One - This instruction means set the referenced bit in host memory to a one.

HBTZ - Host Set Bit to Zero - This instruction means set the referenced bit in host memory to a zero.

HSZBO - Host Set Skip on Zero Bit and Set Bit to One - This instruction means skip the next sequential instruction if the referenced bit in host memory is a zero and set the bit to a one.

HSZB - Host Skip on Zero Bit - This instruction means skip the next sequential instruction if the referenced bit in host memory is a zero.

HSNB - Host Skip on Non-zero Bit - This instruction means skip the next sequential instruction if the referenced bit in host memory is a one.

HINS - Host Increment and Skip if Zero - This instruction means increment the referenced location in host memory and skip if the result is zero.

HDES - Host Decrement and Skip if Zero - This instruction means decrement the referenced location in host memory and skip if the result is zero.

INTON - Interrupts On - This instruction means turn interrupts on.

INTOF - Interrupts Off - This instruction means turn interrupts off.

BRKPT - Breakpoint - This instruction means save the contents of the accumulators, the carry bit, and the program counter and jump to a pre-defined location.

SKION - Skip if Interrupts On - This instruction means skip the next sequential instruction if interrupts are enabled (on).

Various modifications may be made without departing from the spirit and scope of the invention. Thus, the present embodiment is to be considered in all repects as illustrative and not restrictive, the scope of the invention being indicated by the appended claims rather than by the foregoing description, and all changes which come within the meaning and range of equivalency of the claims are therefore intended to be embraced therein.

What is claimed is:

1. A communications controller for use in connecting a plurality of input/output devices to a host central processing unit, said host central processing unit having associated therewith a main memory and being connected to a host input/output bus, said communications controller implemented on a single board and comprising:
    a. a central processor bus,
    b. a host interface section connected to said host input/output bus and said communications controller and serving as a communications link between said central processor bus and said host input/output bus,
    c. a control processor section connected to said central processor bus for controlling the operations of the controller, said control processor section having instruction register means,
    d. a memory section connected to said central processor bus for providing local read/write storage for the processor, said memory section including a memory having a plurality of locations each for holding an instruction for character processing,
    e. a data manipulation processor section connected to said central processor bus and said control processor section and responsive to instructions transferred to said instruction register means for operating on said data either in said memory section or said control processor section, and
    f. a communications interface section connected to said central processor bus for interfacing said communications controller with said plurality of input/output devices.

2. The communications controller of claim 1 and wherein said host interface section includes an internal mapping unit connected to said central processor bus and said host input/output bus for expanding the bit size of the address provided by the control processor section to the bit size of the address of the CPU.

3. The communications controller of claim 2 and wherein the internal mapping unit expands the bit size of the address from 15 bits to between 17 and 19 bits.

4. The communications controller of claim 1 and further including a status section connected to said central processor bus, for providing status indications to other sections of the communications controller.

5. The communication controller of claim 2 and wherein the memory section includes a power up ROM connected to said central processor bus for containing data for use initializing certain logic on power, for use in transferring data between the host CPU and the central processor bus and for enabling the power up ROM to run internal diagnostics on receipt of an I/O reset command from the host CPU.

6. The communications controller of claim 5 and wherein the status section includes a real time clock coupled to said central processor bus for providing a relatively slow speed timing reference.

7. The communications controller of claim 6 and wherein the communications interface section includes a communications data bus coupled to said central processor bus and a plurality of UART's connected to said communications data bus.

8. The communications controller of claim 7 and wherein the communications interface section further includes a split baud selection unit connected to said central processor bus and said UARTS for enabling the transmission and receipt of data at different BAUD rates.

9. The communications controller of claim 2 and wherein said memory section includes a local memory unit coupled to said central processor bus for storing control and operating instructions and data.

10. The communications controller of claim 2 and wherein said host interface section includes data channel means connected to said host input/output bus for enabling transfer of data to and from the host CPU by direct memory access with a minimum of host CPU intervention.

11. A data processing system comprising a host central processing unit, a main memory coupled to said host central processing unit, a host input/output bus coupled to said host central processing unit, a plurality of input/output devices and a communications controller for use connecting said plurality of input/output devices to said host central processing unit, said communications controller implemented on a single board and comprising:
    a. a central processor bus,
    b. a host interface section connected to said host input/output bus and said communications controller and serving as a communications link between said central processor bus and said host input/output bus,
    c. a control processor section connected to said central processor bus for controlling the operations of the controller, said control processor section having instruction register means,
    d. a memory section connected to said central processor bus for providing local read/write storage for the processor, said memory section including a memory having a plurality of locations each for holding an instructions for character processing,
    e. a data manipulation processor section connected to said central processor bus and said control processor section and responsive to instructions transferred to said instruction register means for operating on said data either in said memory section of said control processor section, and
    f. a communications interface section connected to said central processor bus for interfacing said communications controller with said plurality of input/output devices.

12. The communications controller of claim 11 and further including a status section for providing status indications to other section of the communications controller.

13. The communications controller of claim 12 and wherein said host interface section includes an internal mapping unit connected to said central processor bus and said host input/output bus for expanding the bit size of the address provided by the control processor section to the bit size of the address of the CPU.

14. The communications controller of claim 13 and wherein the internal mapping unit expands the bit size of the address from 15 bits to between 17 and 19 bits.

15. The communication controller of claim 12 and wherein the memory section includes a power up ROM connected to said central porcessor bus for containing data for use initializing certain logic on power, for use in transferring data between the host CPU and the central processor bus and for enabling the power up ROM to run internal diagnostics on receipt of an I/O reset command from the host CPU.

16. The communications controller of claim 15 and wherein the status section includes a real time clock coupled to said central processor bus for providing a relatively slow speed timing reference.

17. The communication controller of claim 16 and wherein the communications interface section includes a communications data bus coupled to said central processor bus and a plurality of UART's connected to said communications data bus.

18. The communications controller of claim 17 and wherein the communications interface section further includes a split baud selection unit connected to said central processor bus and said UARTS for enabling the transmission and receipt of data at different BAUD rates.

19. The communications controller of claim 12 and wherein said memory section includes a local memory unit coupled to said central processor bus for storing control and operating instructions and data.

20. The communications controller of claim 12 and wherein said host interface section includes data channel means connected to said host input/output bus for enabling transfer of data to and from the host CPU by direct memory access with a minimum of host CPU intervention.

* * * * *